United States Patent
Oh et al.

(10) Patent No.: US 12,153,529 B2
(45) Date of Patent: Nov. 26, 2024

(54) MEMORY SYSTEM AND COMPUTING SYSTEM INCLUDING THE SAME

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Kiseok Oh, Suwon-si (KR); Jaewook Lee, Seoul (KR); Wenjing Jin, Seoul (KR); Jongsung Lee, Suwon-si (KR); Juyun Jung, Suwon-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 92 days.

(21) Appl. No.: 18/110,582

(22) Filed: Feb. 16, 2023

(65) Prior Publication Data
US 2023/0376427 A1    Nov. 23, 2023

(30) Foreign Application Priority Data

May 17, 2022 (KR) .................. 10-2022-0059913
Jul. 13, 2022 (KR) .................. 10-2022-0086052

(51) Int. Cl.
G06F 12/00    (2006.01)
G06F 12/02    (2006.01)
(Continued)

(52) U.S. Cl.
CPC ...... *G06F 13/1668* (2013.01); *G06F 12/0238* (2013.01); *G06F 12/0873* (2013.01); *G06F 13/4221* (2013.01)

(58) Field of Classification Search
CPC ............ G06F 13/1668; G06F 12/0238; G06F 12/0873; G06F 13/4221
See application file for complete search history.

(56) References Cited

U.S. PATENT DOCUMENTS 6,742,097 B2    5/2004  Woo et al.
8,010,764 B2    8/2011  Keller, Jr. et al.
(Continued)

*Primary Examiner* — John A Lane
(74) *Attorney, Agent, or Firm* — Sughrue Mion, PLLC

(57) ABSTRACT

A memory system includes a memory resource and a smart controller. The memory resource includes semiconductor memory devices, the semiconductor memory devices are divided into a first semiconductor memory and a second semiconductor memory for each of a plurality of channels, and the first semiconductor memory the second semiconductor memory belong to different ranks. The smart controller, connected to the semiconductor memory devices through the channels, controls the semiconductor memory devices by communicating a plurality of hosts through a compute express link (CXL) interface, and each of the plurality of hosts drives at least one virtual machine. The smart controller controls a power mode of the memory resource by managing an idle memory region from among a plurality of memory regions of the plurality of semiconductor memory devices at a rank level without intervention of the plurality of hosts, the plurality of memory regions storing data.

20 Claims, 23 Drawing Sheets

(51) Int. Cl.
*G06F 12/0873* (2016.01)
*G06F 13/16* (2006.01)
*G06F 13/42* (2006.01)

(56) References Cited

U.S. PATENT DOCUMENTS

| | | |
|---|---|---|
| 8,412,972 B2 | 4/2013 | Cheung et al. |
| 8,719,527 B2 | 5/2014 | Carter et al. |
| 9,311,228 B2 | 4/2016 | Daly et al. |
| 10,198,216 B2 | 2/2019 | Balakrishnan et al. |
| 2013/0124810 A1* | 5/2013 | Carter ............ G06F 12/08 711/171 |
| 2015/0046732 A1* | 2/2015 | Chun ............ G06F 12/0607 713/323 |
| 2016/0216758 A1* | 7/2016 | Kachare ............ G06F 3/0634 |
| 2020/0293438 A1* | 9/2020 | Walker ............ G06F 3/0604 |
| 2021/0149815 A1 | 5/2021 | Gayen et al. |
| 2021/0278998 A1 | 9/2021 | Li |
| 2021/0303459 A1 | 9/2021 | Tai et al. |

* cited by examiner

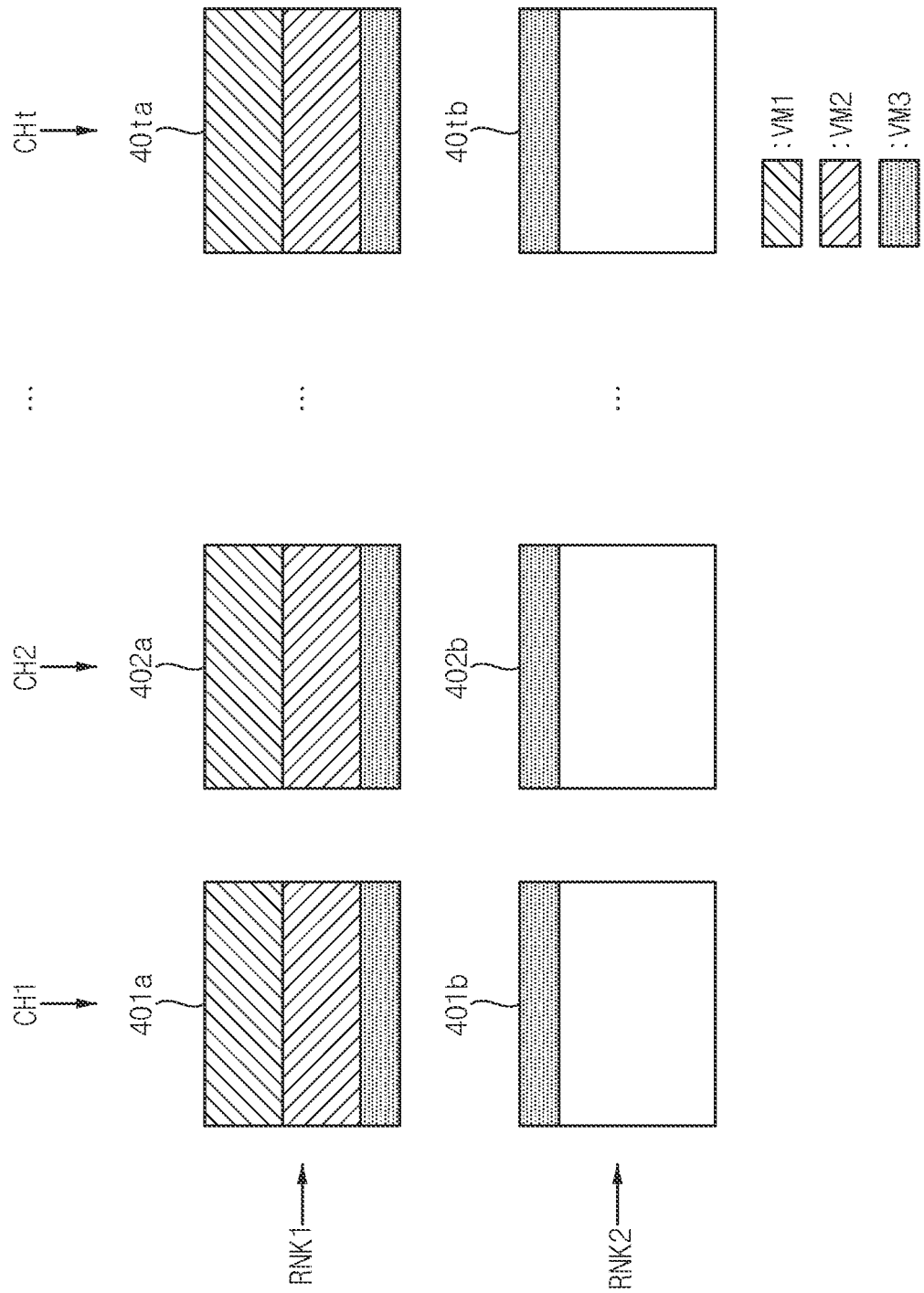

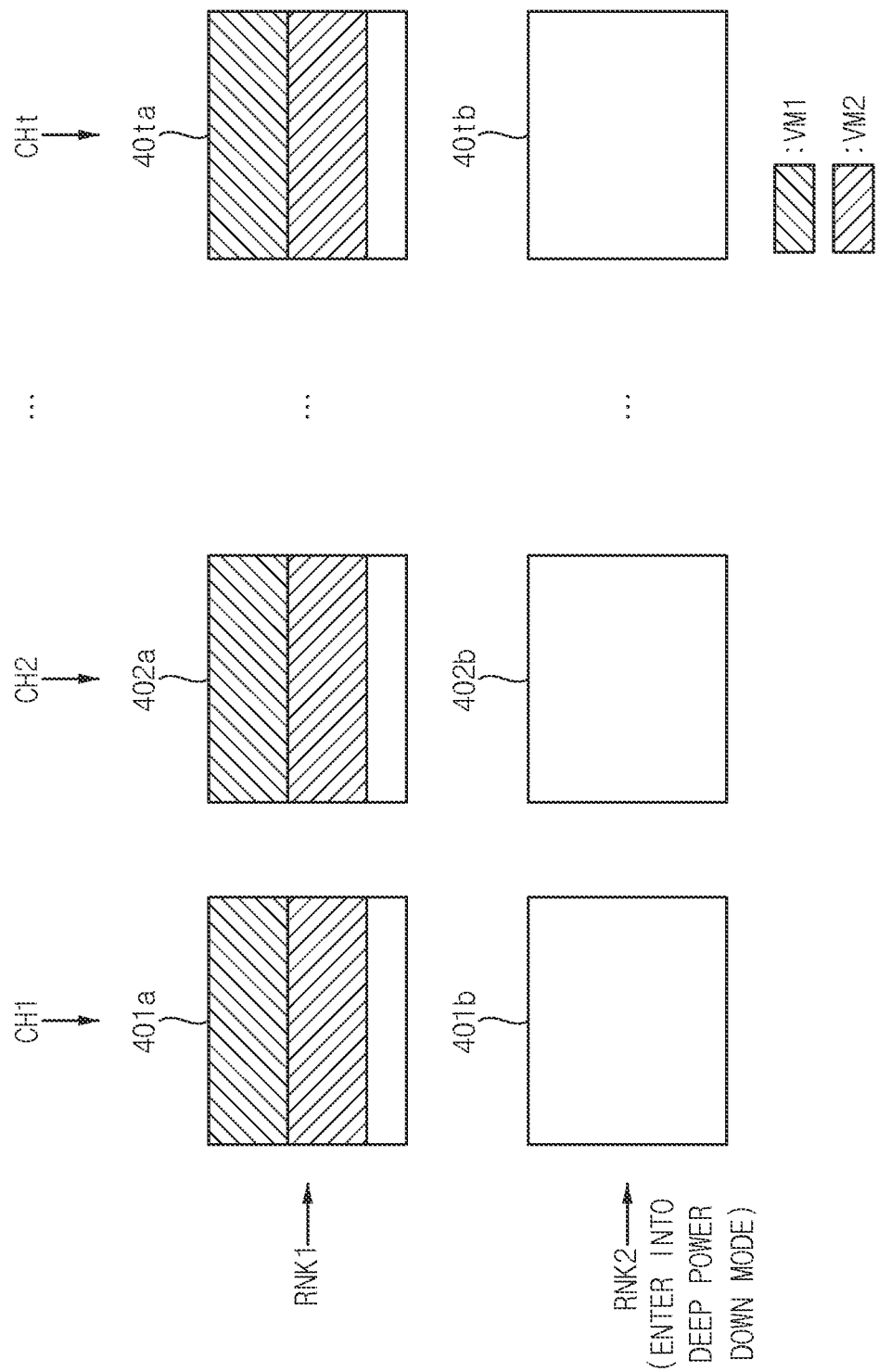

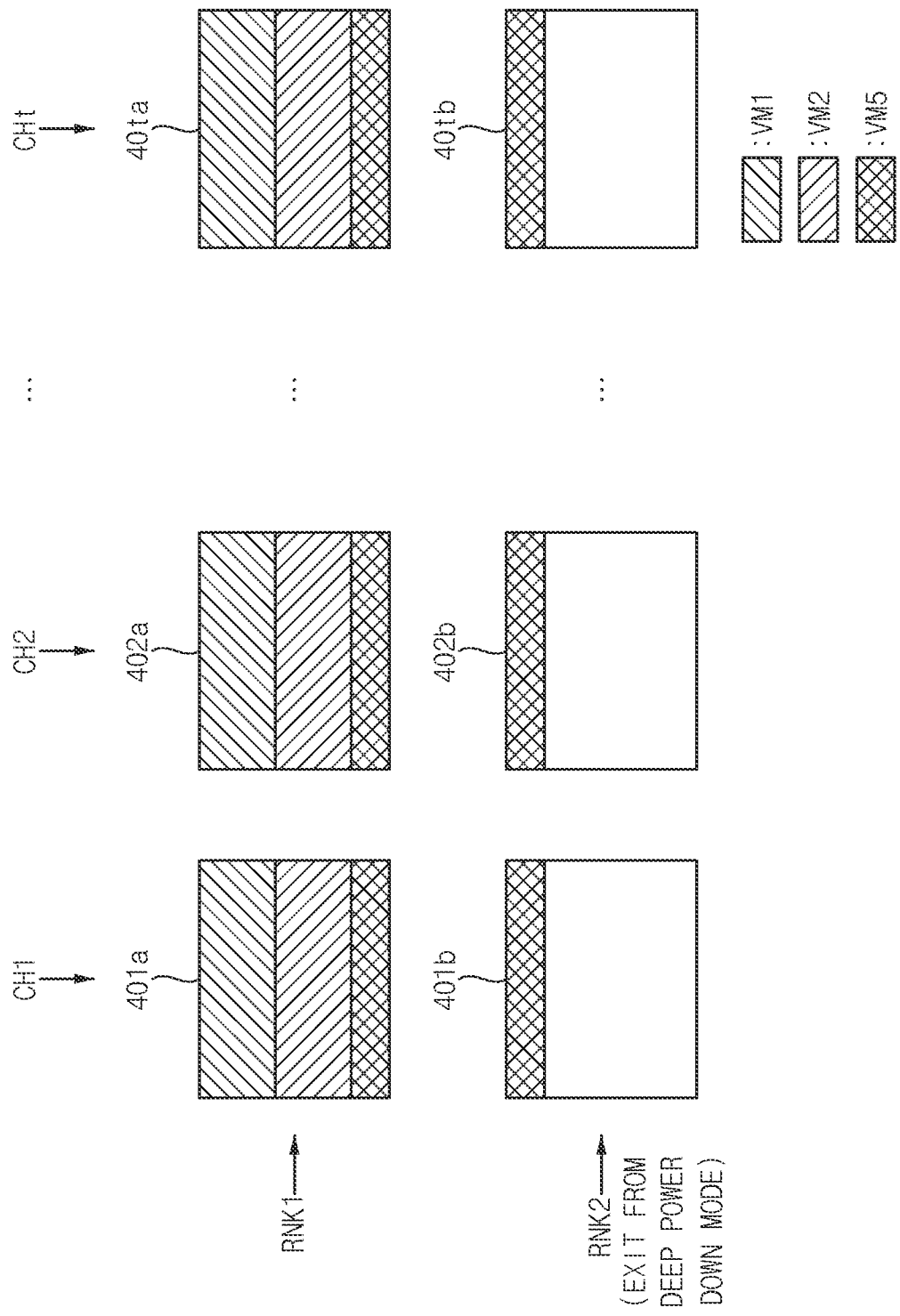

320

| HPA | DPA |
|-----|-----|
| HPA1 | DPA1 |
| HPA2 | DPA2 |
| ⋮ | ⋮ |
| HPAr | DPAr |

↑ 321   ↑ 323

MEMORY SYSTEM AND COMPUTING SYSTEM INCLUDING THE SAME

CROSS-REFERENCE TO RELATED APPLICATIONS

This application is based on and claims priority under 35 USC § 119 to Korean Patent Application No. 10-2022-0059913, filed on May 17, 2022 and to Korean Patent Application No. 10-2022-0086052, filed on Jul. 13, 2022, in the Korean Intellectual Property Office (KIPO), the disclosures of which are incorporated herein by references in their entirety.

BACKGROUND

1. Field

The disclosure relates generally to memory devices, and more particularly to memory systems capable of reducing power consumption and computing systems including the same.

2. Description of Related Art

A computing system may provide various information technology (IT) services to a user. As various IT services are provided to the user, the amount of data that are processed by the computing system increases. The computing system is developing into a heterogeneous computing environment and high capacity memory system to provide various IT services. Nowadays, various technologies for reducing power consumption in the high capacity memory system are being developed.

SUMMARY

According to one or more aspects of the disclosure, there is provided a memory system capable of reducing power consumption.

According to one or more aspects of the disclosure, there is provided a computing method including a memory system capable of reducing power consumption.

According to an aspects of the disclosure, there is provided a memory system including: a memory resource including a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and a controller connected to the plurality of semiconductor memory devices through the plurality of channels, the controller configured to control the plurality of semiconductor memory devices based on communication with a plurality of hosts through a compute express link (CXL) interface, each of the plurality of hosts configured to drive at least one virtual machine, wherein the controller is configured to control a power mode of the memory resource by managing an idle memory region from among a plurality of memory regions of the plurality of semiconductor memory devices at a rank level without intervention of the plurality of hosts, the plurality of memory regions configured to store data.

According to another aspects of the disclosure, there is provided a computing system including: a plurality of hosts, each of the plurality of hosts configured to drive at least one virtual machine; and a memory system configured to process a memory request from the plurality of hosts based on communication with the plurality of hosts through a compute express link (CXL) interface, wherein the memory system includes: a memory resource including a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and a controller connected to the plurality of semiconductor memory devices through the plurality of channels, the controller configured to control the plurality of semiconductor memory devices based on the communication with the plurality of hosts through the CXL interface, wherein the controller is configured to control a power mode of the memory resource by managing an idle memory region from among a plurality of memory regions of the plurality of semiconductor memory devices at a rank level without intervention of the plurality of hosts, the plurality of memory regions configured to store data, and wherein the idle memory region corresponds to a memory region that does not store the data, from among the plurality of memory regions, or a memory region that has an access frequency smaller than a reference frequency during a reference time interval.

According to another aspects of the disclosure, there is provided a memory system including: a memory resource including a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and a controller connected to the plurality of semiconductor memory devices through the plurality of channels, the controller configured to control the plurality of semiconductor memory devices based on communication with a plurality of hosts through a compute express link (CXL) interface, each of the plurality of hosts configured to drive at least one virtual machine, wherein the controller is configured to control a power mode of the memory resource by managing an idle memory region from among a plurality of memory regions of the plurality of semiconductor memory devices at a rank level without intervention of the plurality of hosts, the plurality of memory regions configured to store data, wherein the controller includes a hot/cold page profiler, and wherein the hot/cold page profiler, based on a total memory traffic requested from at least one host from among the plurality of hosts being smaller than a first reference value, is configured to: monitor a cold page and a hot page from among a plurality of pages of the plurality of the semiconductor memory devices, the cold page storing cold data having a data access frequency smaller than a reference frequency during a reference time interval, and the hot page storing hot data having the data access frequency equal to or greater than the reference frequency during the reference time interval, and perform a data migration to migrate one or more cold pages of a first rank of a first channel from among the plurality of channels to a second rank of the first channel based on a result of the monitoring.

Accordingly, the controller in the memory system and the computing system according to various example embodiments, allocates virtual machines to the plurality of semiconductor memory devices at a rank level, enters a rank, to which the virtual machines are not allocated, to a deep power-down mode, divides memory regions of the plurality of semiconductor memory devices into hot pages and cold pages based on memory requests on the plurality of semiconductor memory devices, migrates cold data of cold pages of one rank to another rank and enters a cold rank including the cold pages into a self-refresh mode, and thus controls the power mode of the memory resource at a rank level.

BRIEF DESCRIPTION OF DRAWINGS

Illustrative, non-limiting example embodiments will be more clearly understood from the following detailed description taken in conjunction with the accompanying drawings.

FIGS. 10A, 10B and 10C illustrate that the remapping engine in the smart controller in FIG. 1 allocates virtual machines, respectively, according to an example embodiment.

DETAILED DESCRIPTION

Figure 1:
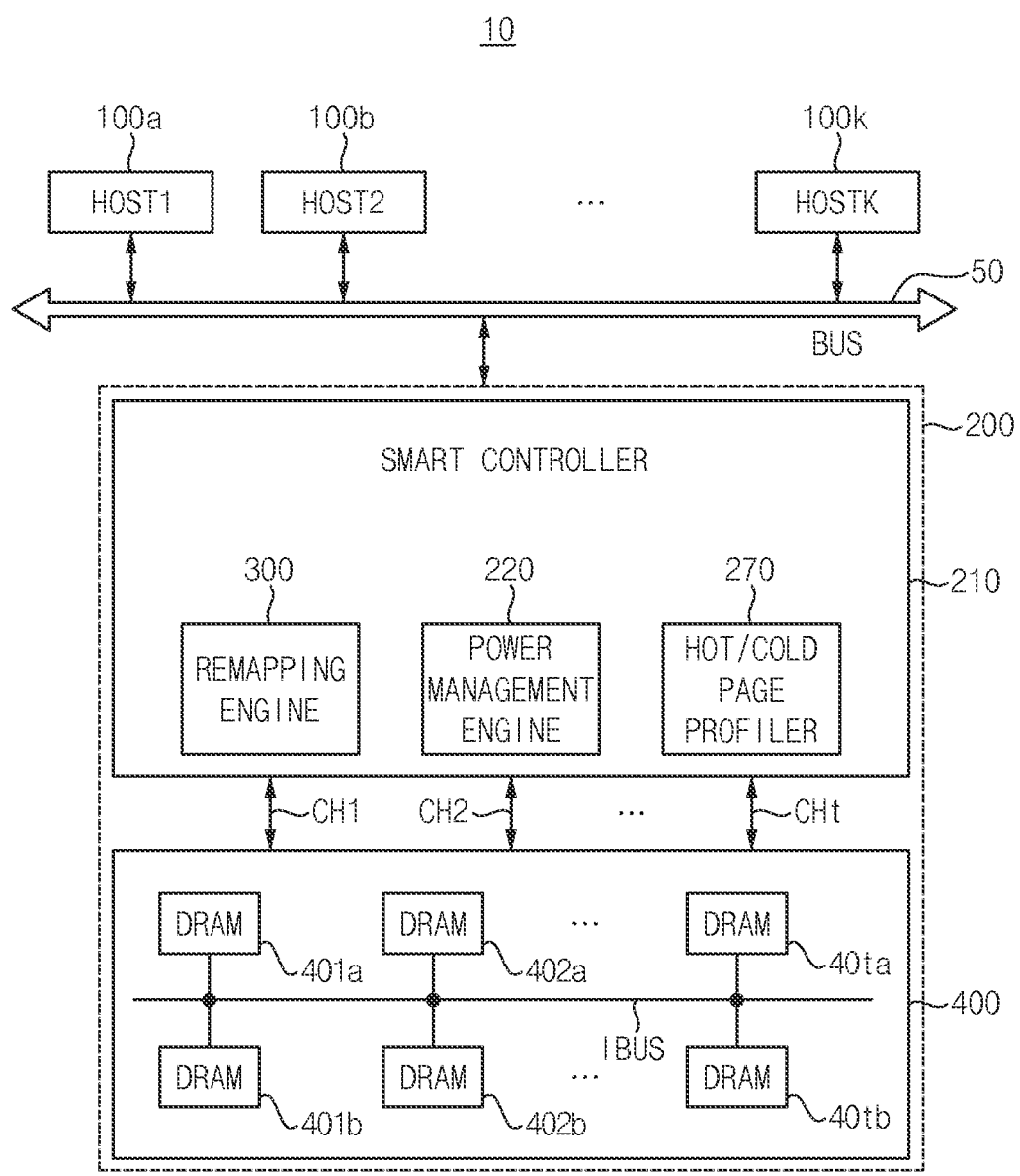
FIG. 1 is a block diagram illustrating a computing system according to an example embodiment.

Various example embodiments will be described more fully with reference to the accompanying drawings, in which embodiments are shown. The disclosure may, however, be embodied in many different forms and should not be construed as limited to the embodiments set forth herein. Like reference numerals refer to like elements throughout this application.

FIG. 1 is a block diagram illustrating a computing system according to an example embodiment.

Referring to FIG. 1, a computing system 10 may include a plurality of hosts HOST1 (100*a*), HOST2 (100*b*), . . . , HOSTK (100*k*) and a memory system 200, which includes a controller and a memory resource. According to an example embodiment, the memory system 200 may include a smart controller 210 and a memory resource 400. Here, K and k are integers greater than two, respectively.

The memory resource 400 may include a plurality of semiconductor memory devices DRAMs 401*a*, 402*a*, . . . , 40*ta* and 401*b*, 402*b*, . . . , 40*tb*. Here, t is an integer greater than two. The plurality of semiconductor memory devices 401*a*, 402*a*, . . . , 40*ta* and 401*b*, 402*b*, . . . , 40*tb* may be connected to each other through an internal bus IBUS.

The smart controller 210 may be referred to as a network of DRAMs (NoD) controller.

The smart controller 210 may be connected to the plurality of semiconductor memory devices 401*a*, 402*a*, . . . , 40*ta* and 401*b*, 402*b*, 40*tb* through a plurality of channels CH1, CH2, . . . , CHt. The plurality of semiconductor memory devices 401*a*, 402*a*, . . . , 40*ta* and 401*b*, 402*b*, . . . , 40*tb* may be divided into a first semiconductor memory and a second semiconductor memory belonging to different ranks for each of the plurality of channels CH1, CH2, . . . , CHt. The different ranks may include at least a first rank and a second rank. However, the disclosure is not limited thereto, and as such, according to another example embodiment, the plurality of semiconductor memory devices 401*a*, 402*a*, . . . , 40*ta* and 401*b*, 402*b*, . . . , 40*tb* may be divided into more than two groups. Moreover the different ranks may include more than two ranks. For example, the different ranks may further include a third rank.

The smart controller 210 may be connected to the plurality of hosts 100*a*, 100*b*, . . . , 100*k* through a compute express link (CXL) bus 50 and may control the plurality of semiconductor memory devices 401*a*, 402*a*, . . . , 40*ta* and 401*b*, 402*b*, . . . , 40*tb* by communicating the plurality of hosts 100*a*, 100*b*, . . . , 100*k* through the CXL interface.

According to an example embodiment, the CXL bus 50 may support a plurality of CXL protocols and messages and/or data may be transmitted through the plurality of CXL protocols. For example, the plurality of CXL protocols may include a non-coherent protocol, a coherent protocol, and a memory access protocol. For example, the plurality of CXL protocols may include an I/O protocol CXL.io, a cache protocol CXL.cache or a memory protocol CXL.memory. According to an example embodiment, the CXL bus 50 may support protocols such as peripheral component interconnection (PCI), PCI express (PCIe), universal serial bus (USB), and serial advanced technology attachment (SATA). A protocol supported by the CXL bus 50 may referred to as an interconnect protocol.

The smart controller 210 may control a power mode of the memory resource 400 by managing an idle memory region from among a plurality of memory regions of the plurality of semiconductor memory devices 401*a*, 402*a*, . . . , 40*ta* and 401*b*, 402*b*, . . . , 40*tb* to store data at a rank level without intervention of the plurality of hosts 100*a*, 100*b*, . . . , 100*k*. According to an example embodiment, the idle memory region from among the plurality of memory regions may be identified based on one or more criteria or characteristics. For example, the idle memory region may correspond to a memory region that does not store the data, from among a plurality of memory regions, or a memory region that is accessed for the storing data having an access frequency smaller than a reference frequency during a reference time interval. However, the disclosure, is not limited thereto, and as such, according to another example embodiment, the idle memory region from among the plurality of memory regions may be identified based on another criterion.

The smart controller 210 may include a power management engine 220, a hot/cold page profiler 270 and a remapping engine 300.

According to an example embodiment, the hot/cold page profiler 270 may monitor a memory traffic corresponding to each of the plurality of hosts 100*a*, 100*b*, 100*k*. According to an example embodiment, the hot/cold page profiler 270 may be activated based on a memory traffic requested by at least one host from among the plurality of hosts 100*a*, 100*b*, . . . , 100*k* being smaller than a first reference value during a reference time interval. For example, the hot/cold page profiler 270 may monitor a memory traffic requested by each of the plurality of hosts 100*a*, 100*b*, . . . , 100*k* and may be activated in response to a memory traffic requested by at least one host from among the plurality of hosts 100*a*, 100*b*, . . . , 100*k* being smaller than a first reference value during a reference time interval.

The hot/cold page profiler 270 may periodically monitor a cold page and a hot page from among a plurality of pages of the plurality of the semiconductor memory devices 401*a*, 402*a*, . . . , 40*ta* and 401*b*, 402*b*, . . . , 40*tb* and may perform a data migration to migrate cold pages of a first rank of a first channel from among the plurality of channels CH1, CH2, . . . , CHt to a second rank of the first channel based on a result of the monitoring. The cold page may store cold data having the access frequency smaller than a reference frequency during a reference time interval and the hot page may store hot data having an access frequency equal to or greater than the reference frequency during the reference time interval.

According to an example embodiment, based on the data migration being performed, the remapping engine 300 may map first physical addresses of the cold pages of the first rank of the first channel to second physical addresses of pages of the second rank of the first channel. For example, in response to the data migration being performed, The remapping engine 300 may map first physical addresses of the cold pages of the first rank of the first channel to second physical addresses of pages of the second rank of the first channel.

The power management engine 220 may control the power mode of the memory resource 400 based on whether the data migration is performed.

For example, when the data migration is performed because available data storage capacity of the second rank of the first channel is enough, data of the cold pages of the first channel is migrated (or moved) to pages of the second rank of the first channel and the power management engine 220 may enter the second rank of the first channel into a self-refresh mode.

For example, when the data migration is performed and when cold pages of the second rank of the first channel is migrated to another rank (for example, the cold pages of the second rank of the first channel is migrated to free pages of a third rank), the power management engine 220 may enter the second rank of the first channel into a deep power-down mode. The third rank may be included in the first channel or may be included in another channel (for example, a second channel).

For example, when the data migration is performed when cold pages of the second rank of the first channel is not migrated to another rank (a third rank) because available data storage capacity of the third rank is smaller than a size of the cold pages of the second rank of the first channel, the power management engine 220 may enter the second rank of the first channel into a self-refresh mode.

Each of the plurality of hosts 100*a*, 100*b*, . . . , 100*k* may drive at least one virtual machine. The remapping engine 300 may allocate the at least one virtual machine running on each of the plurality of hosts 100*a*, 100*b*, . . . , 100*k* to a same rank of each of the plurality of channels CH1, CH2, . . . , CHt, and the power management engine 220 may enter the idle memory region into a deep power-down mode or exit the idle memory region from the deep power-down mode based on allocation and deallocation of the at least one virtual machine.

For example, when the remapping engine 300 allocates the at least one virtual machine running on each of the plurality of hosts 100*a*, 100*b*, . . . , 100*k* to the first rank of each of the plurality of channels CH1, CH2, . . . , CHt, the power management engine 220 may enter the second rank of each of the plurality of channels CH1, CH2, . . . , CHt into the deep power-down mode.

The smart controller 210 may refer to a device that provides functions to the plurality of hosts 100*a*, 100*b*, . . . , 100*k*. According to an example embodiment, the smart control 210 may be implement by hardware, software or combination of hardware and software. According to an example embodiment, "units", "modules", "engines" and/or other components in the smart controller 210 may be implemented by hardware, software or a combination of hardware and software. For example, these components may be implemented by processors or electronic circuits. According to another example embodiment, these components may be software units implemented by program codes or instructions stored in the memory device, which may be executed by a processor to perform one or more operations. According to an example embodiment, the processor may be a special processor for performing the corresponding one or more operations (for example, an embedded processor) or a common processor for performing the corresponding one or more operations by performing at least one software program stored in the memory device (for example, a central processing unit (CPU) or an application processor (AP)).

According to an example embodiment, based on the CXL specification 2.0, the smart controller 210 may be an accelerator that supports the CXL specification. For example, at least some of computing operations and I/O operations executed in the plurality of hosts 100*a*, 100*b*, . . . , 100*k* may be off-loaded to the smart controller 210. According to an example embodiment, the each of the plurality of hosts 100a, 100b, . . . , 100k may include any one or any combination of a programmable component (e.g., a graphic processing unit (GPU) and a neural processing unit (NPU), a component (e.g., an intellectual property (IP) core) that provides a fixed function and a reconfigurable component (e.g., a field programmable gate array (FPGA)).

Figure 2:
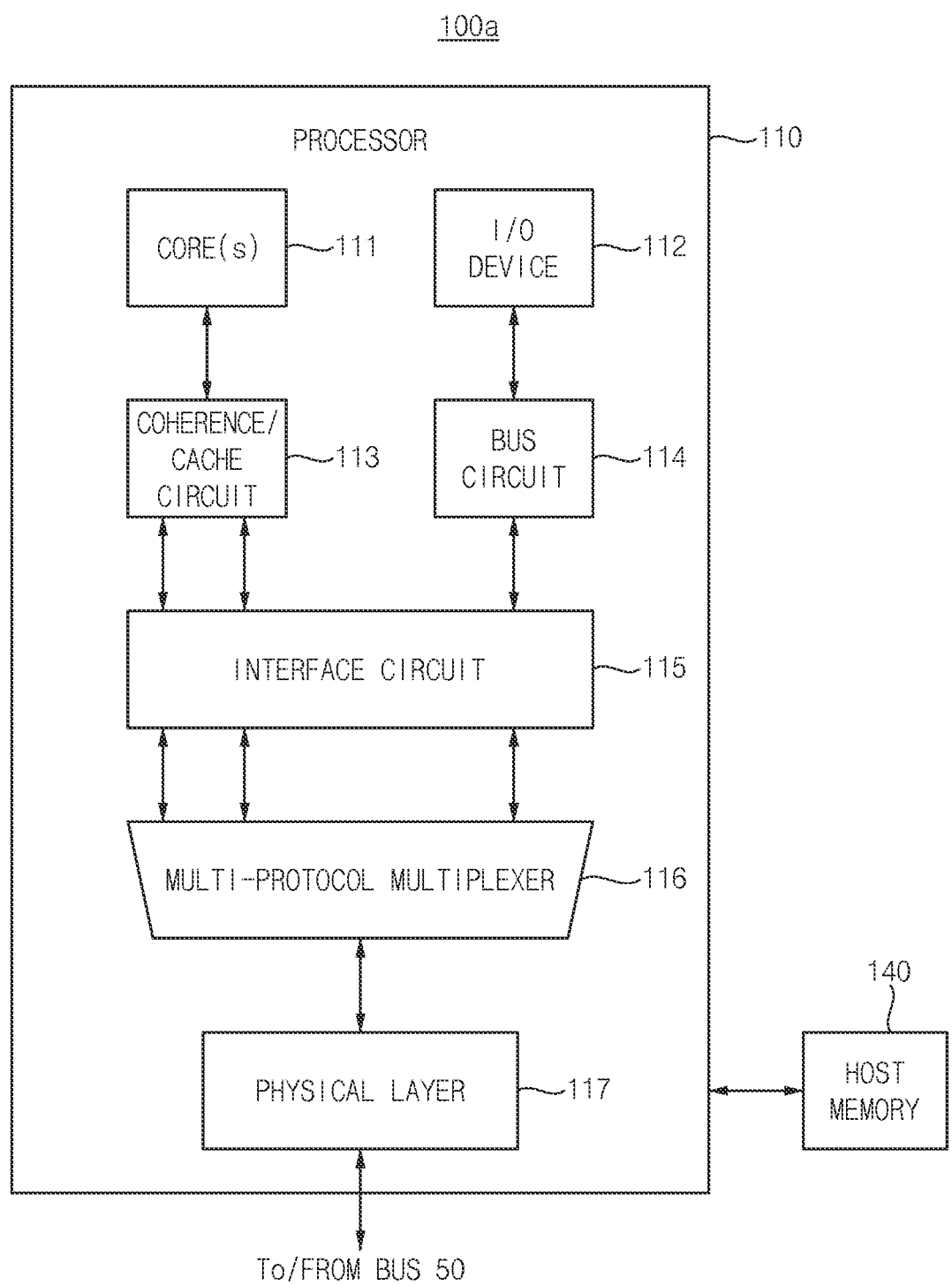
FIG. 2 is a block diagram illustrating one of the plurality of hosts in the computing system of FIG. 1 according to an example embodiment.

FIG. 2 is a block diagram illustrating one of the plurality of hosts in the computing system of FIG. 1 according to an example embodiment.

In FIG. 2, a configuration of the host 100a from among the plurality of hosts 100a, 100b, . . . , 100k is illustrated. Each configuration of the hosts 100b, . . . , 100k may be substantially the same as the configuration of the host 100a.

Referring to FIG. 2, the host 100a may include a processor 110 and a host memory 140.

The processor 110 may be a central processing unit (CPU) of the host 100a. According to an example embodiments, the processor 110 may be a CXL-based processor. As illustrated in FIG. 2, the processor 110 may be connected to the host memory 140 and may include a physical layer 117, a multi-protocol multiplexer 116, an interface circuit 115, a coherence/cache circuit 113, a bus circuit 114, at least one core 111 and an input/output (I/O) device 112.

According to an example embodiment, the at least one core 111 may include one or more cores. According to an example embodiment, the at least one core 111 may execute an instruction and be connected to the coherence/cache circuit 113. The coherence/cache circuit 113 may include a cache hierarchy and may be referred to as a coherence/cache logic. As illustrated in FIG. 2, the coherence/cache circuit 113 may communicate with the at least one core 111 and interface circuit 115. For example, the coherence/cache circuit 113 may enable a communication through at least protocols including a coherent protocol and a memory access protocol. According to an example embodiment, the coherence/cache circuit 113 may include a direct memory access (DMA) circuit. The I/O device 112 may be used to communicate with the bus circuit 114. For example, the bus circuit 114 may be a PCIe logic and the I/O device 112 may be a PCIe I/O device.

The interface circuit 115 may enable communication between components of the processor 110 and the memory system 200. For example, the interface circuit 115 may facilitate communication between the coherence/cache circuit 113, the bus circuit 114 and the memory system 200. For example, the interface circuit 115 may facilitate a communication between the components of the processor 110 and the memory system 200 through the CXL bus 50. According to an example embodiment, the interface circuit 115 may enable communication between components of the processor 110 and the memory system 200 according to a plurality of protocols (e.g., a non-coherent protocol, the coherent protocol and the memory access protocol). According to an example embodiment, the interface circuit 115 may determine one of the plurality of protocols for communication between the components of the processor 110 and the memory system 200 based on a type of message and data to be communicated.

The multi-protocol multiplexer 116 may include at least one protocol queue. The interface circuit 115 may be connected to the at least one protocol queue and transmit and receive messages and/or data to and from the memory system 200 through the least one protocol queue. According to an example embodiment, the interface circuit 115 and the multi-protocol multiplexer 116 may be integrally formed into one component. According to an example embodiment, the multi-protocol multiplexer 116 may include a plurality of protocol queues corresponding respectively to the plurality of protocols supported by the CXL bus 50. According to an example embodiment, the multi-protocol multiplexer 116 may arbitrate communications of different protocols and provide selected communications the physical layer 117.

Figure 3:
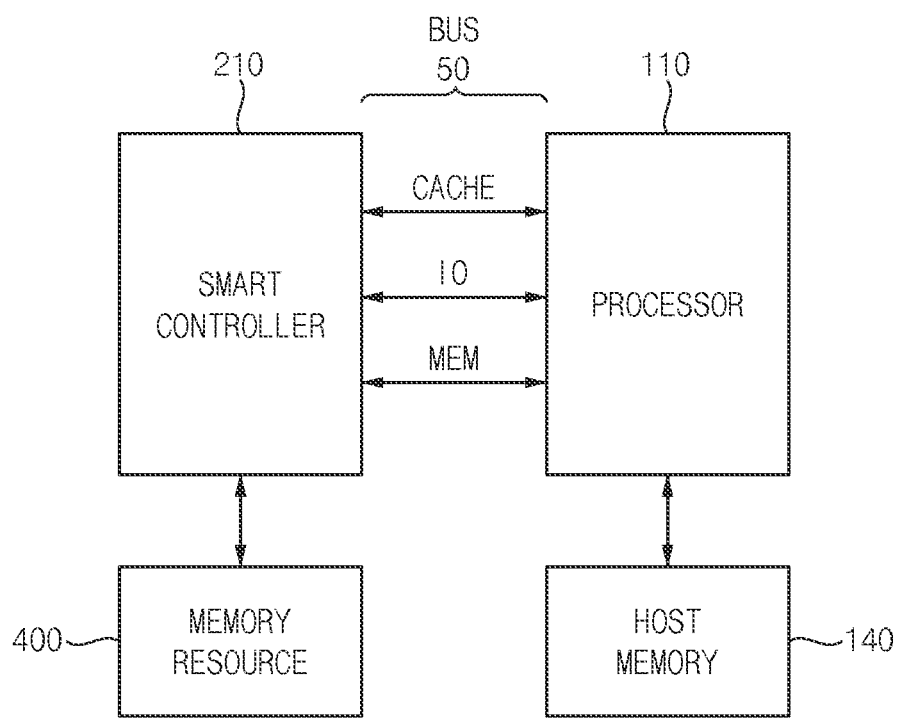
FIG. 3 illustrates an example of a multi-protocol for communication in the computing system of FIG. 1.

FIG. 3 illustrates an example of a multi-protocol for communication in the computing system of FIG. 1.

Referring to FIG. 3, the processor 110 and the smart controller 210 may communicate with each other based on a plurality of protocols.

According to the above-mentioned CXL examples, the plurality of protocols may include a memory protocol MEM, a coherent protocol CACHE and a non-coherent protocol IO. The memory protocol MEM may define a transaction from a primary device or a primary component to a secondary device or a second component and a transaction from the secondary device or the second component to the primary device or the primary component. The coherent protocol CACHE may define interactions between the smart controller 210 and the processor 110. For example, an interface of the coherent protocol CACHE may include three channels including a request, a response and data. The non-coherent protocol IO may provide a non-coherent load/store for I/O devices.

The smart controller 210 may communicate with the memory resource 400 and the processor 110 may communicate with the host memory 140.

Figure 4:
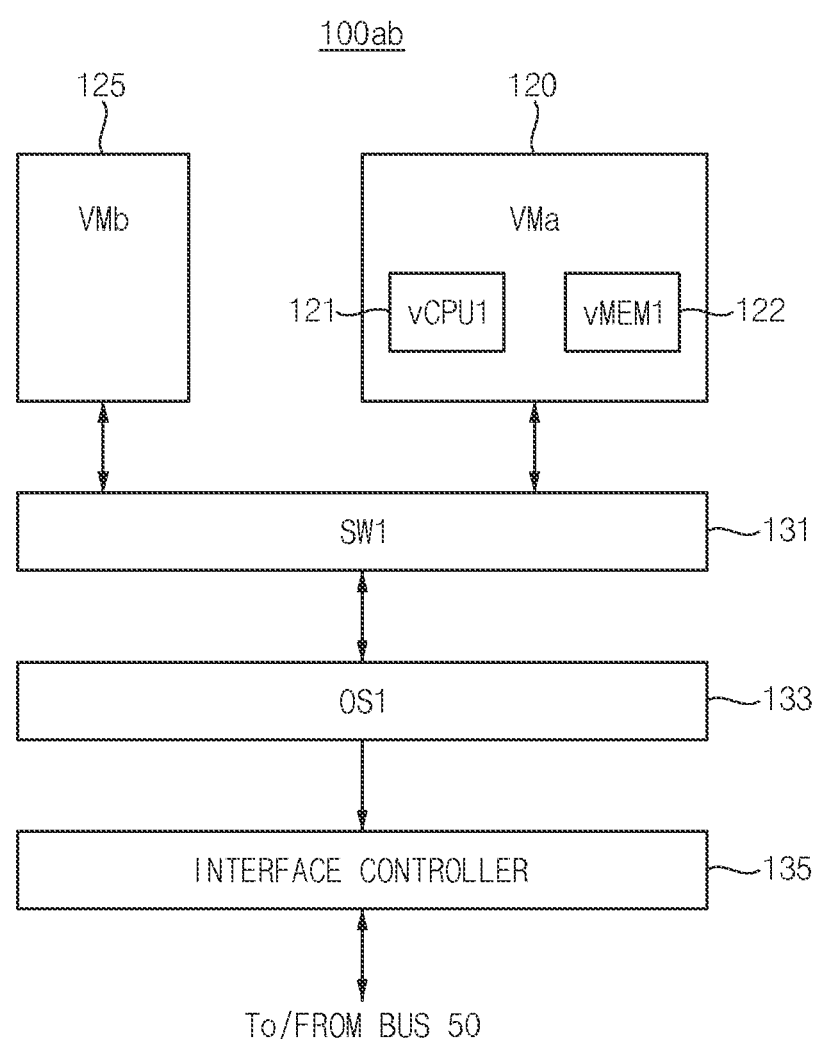
FIG. 4 is a block diagram illustrating one of the plurality of hosts in the computing system of FIG. 1 according to an example embodiment.

FIG. 4 is a block diagram illustrating one of the plurality of hosts in the computing system of FIG. 1 according to an example embodiment.

In FIG. 4, a configuration of a host 100ab corresponding to the host 100a from among the plurality of hosts 100a, 100b, . . . , 100k. Each configuration of the hosts 100b, . . . , 100k may be substantially the same as the configuration of the host 100ab.

Referring to FIG. 4, the host 100ab may include a first operating system OS1 133, a plurality of virtual machines VMa 120 and VMb 125, a first switch SW1 131 and an interface controller 135. The first operating system 133 may be driven on the host 100ab and may control or manage overall operations of the host 100ab.

According to an example embodiment, a plurality of virtual machines, including the virtual machine 120 and the virtual machine 125 may be a virtual system that is driven on the first operating system 133. The plurality of virtual machines may drive independent or individual operating systems, respectively. For example, the virtual machine 120 may include a first virtual CPU vCPU1 121 and a first virtual memory vMEM1 122.

The first virtual CPU 121 may be configured to perform various operations that are driven by the first virtual machine 120. The first virtual memory 122 may be configured to store data that are used or generated at the virtual machine 120.

Structure of the virtual machine 125 may be similar with the structure of the virtual machine 120, and thus detailed description on the virtual machine 125 will be omitted.

The first switch 131 may be configured to perform a function of arbitrating, switching, or routing various communication requests or various communication packets. The first switch 131 may be a physical switch or a virtual switch. The first switch 131 may perform a function of arbitrating, switching, or routing various communication between various components (e.g., virtual machines) included in the host 100ab or communications between the hosts.

The interface controller 135 may be an interface circuit configured to support heterogeneous computing interface such as a CXL interface. According to an example embodiment, the heterogeneous computing interface may be interface complying with the CXK protocol, but the disclosure is not limited thereto. For example, the heterogeneous computing interface may be implemented based on at least one of various computing interfaces Gen-Z protocol, an NVLink protocol, a CCIX protocol, and an Open CAPI protocol.

Figure 5:
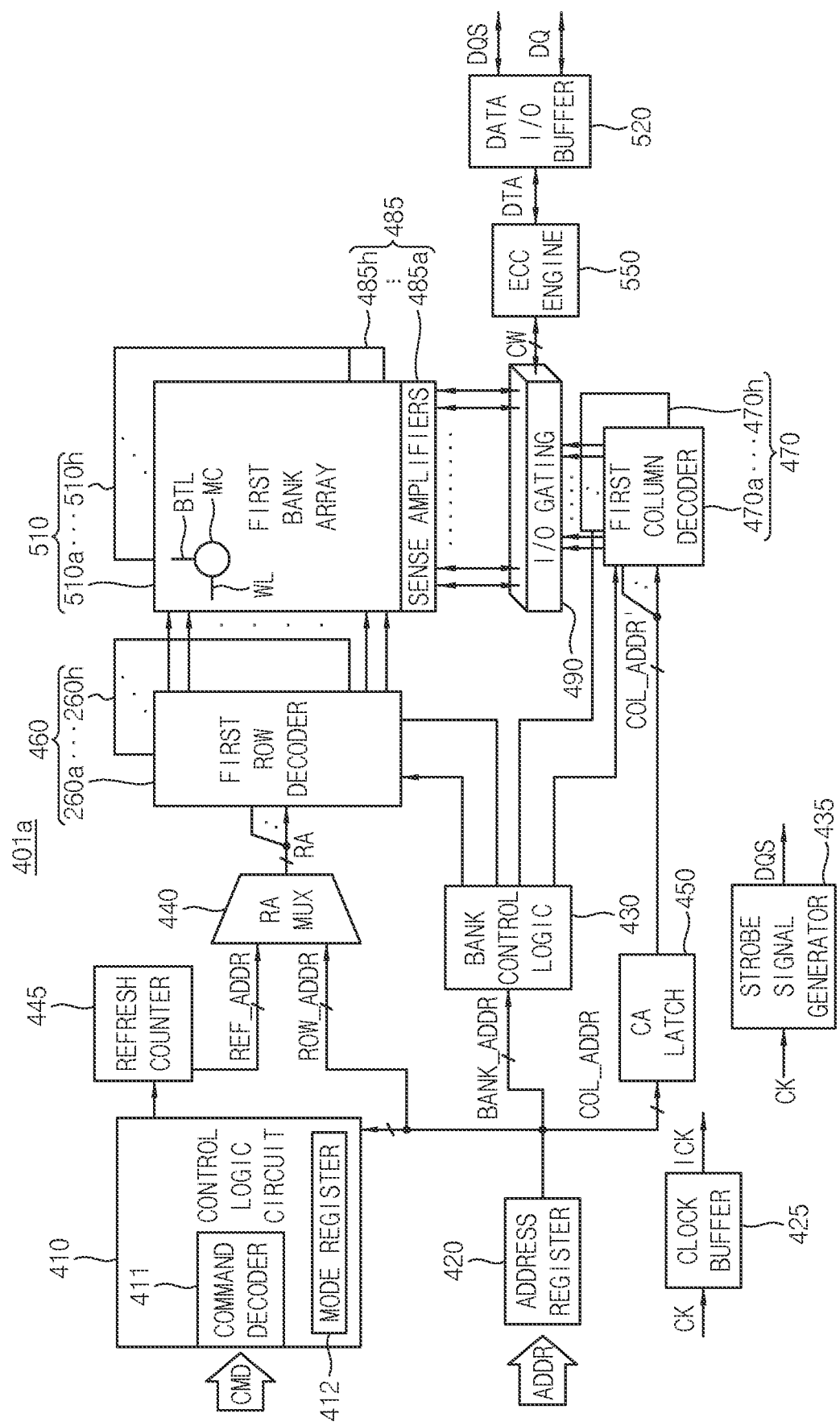
FIG. 5 is a block diagram illustrating an example one of the semiconductor memory devices in the computing system of FIG. 1 according to an example embodiment.

FIG. 5 is a block diagram illustrating an example one of the semiconductor memory devices in the computing system of FIG. 1 according to an example embodiment.

In FIG. 5, a configuration of the semiconductor memory device 401a from among the plurality of semiconductor memory devices 401a, 402a, . . . , 40ta and 401b, 402b, . . . , 40tb is illustrated, and a configuration of each of the plurality of semiconductor memory devices 402a, . . . , 40ta and 401b, 402b, . . . , 40tb may be substantially the same as the configuration of the semiconductor memory device 401a.

Referring to FIG. 5, the semiconductor memory device 401a may include a control logic circuit 410, an address register 420, a clock buffer 425, a bank control logic 430, a strobe signal generator 435, a refresh counter 445, a row address multiplexer 440, a column address latch 450, a row decoder 460, a column decoder 470, a memory cell array 510, a sense amplifier unit 485, an I/O gating circuit 490, an error correction code (ECC) engine 550, and a data I/O buffer 520S.

For example, the semiconductor memory device 401a may be a volatile memory device based on synchronous dynamic random access memory (SDRAM) device.

The memory cell array 510 includes first through eighth bank arrays 510a~510h. The row decoder 460 includes first through eighth bank row decoders 460a~460h respectively coupled to the first through eighth bank arrays 510a~510h, the column decoder 470 includes first through eighth bank column decoders 470a~470h respectively coupled to the first through eighth bank arrays 510a~510h, and the sense amplifier unit 485 includes first through eighth bank sense amplifiers 485a~485h respectively coupled to the first through eighth bank arrays 510a~510h.

The first through eighth bank arrays 510a~510h, the first through eighth bank row decoders 460a~460h, the first through eighth bank column decoders 470a~470h and first through eighth bank sense amplifiers 485a~485h may form first through eighth banks. Each of the first through eighth bank arrays 510a~510h may include a plurality of memory cells MC formed at intersections of a plurality of word-lines WL and a plurality of bit-line BTL.

The address register 420 may receive the address ADDR including a bank address BANK_ADDR, a row address ROW_ADDR and a column address COL_ADDR from the smart controller 210. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. One of the first through eighth bank row decoders 460a~460h corresponding to the bank address BANK_ADDR is activated in response to the bank control signals, and one of the first through eighth bank column decoders 470a~470h corresponding to the bank address BANK_ADDR is activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 is applied to the first through eighth bank row decoders 460a~460h.

The refresh counter 445 may sequentially increase or decrease the refresh row address REF_ADDR and may output the refresh row address REF_ADDR under control of the control logic circuit 410.

The activated one of the first through eighth bank row decoders 460a~460h, by the bank control logic 430, may decode the row address RA that is output from the row address multiplexer 440, and may activate a word-line corresponding to the row address RA. For example, the activated bank row decoder applies a word-line driving voltage to the word-line corresponding to the row address.

The column address latch 450 may receive the column address COL_ADDR from the address register 420, and may temporarily store the received column address COL_ADDR. According to an example embodiment, in a burst mode, the column address latch 450 generates column addresses COL_ADDR' that increment from the received column address COL_ADDR. The column address latch 450 may apply the temporarily stored column address COL_ADDR or generated column address COL_ADDR' to the first through eighth bank column decoders 470a~470h.

The activated one of the first through eighth bank column decoders 470a~470h may activate a sense amplifier corresponding to the bank address BANK_ADDR and the column address COL_ADDR through the I/O gating circuit 490.

The I/O gating circuit 490 may include a circuitry for gating input/output data, and further includes input data mask logic, read data latches for storing data that is output from the first through eighth bank arrays 510a~510h, and write drivers for writing data to the first through eighth bank arrays 510a~510h.

Codeword CW read from one bank array of the first through eighth bank arrays 510a~510h may be sensed by a sense amplifier coupled to the one bank array from which the data is to be read, and may be stored in the read data latches. The codeword CW stored in the read data latches may be provided to the ECC engine 550, the ECC engine 550 may generate data DTA by performing an ECC decoding on the codeword CW to provide the data DTA to the data I/O buffer 520, the data I/O buffer 520 may convert the data DTA to data signal DQ and the data I/O buffer 520 may transmit the data signal DQ with a data strobe signal DQS to the smart controller 210.

The data signal DQ to be written in a selected one bank array of the first through eighth bank arrays 510a-510h may be provided to the data I/O buffer 520 from the smart controller 210. The data I/O buffer 520 may convert the data signal DQ to the data DTA and may provide the data DTA to the ECC engine 550. The ECC engine 550 may perform ECC encoding on the data DTA to generate parity bits, and the ECC engine 550 may provide the codeword CW including the data DTA and the parity bits to the I/O gating circuit 490. The I/O gating circuit 490 may write the codeword CW in a sub-page in the selected one bank array through the write drivers.

The data I/O buffer 520 may provide the data signal DQ from the smart controller 210 to the ECC engine 550 by converting the data signal DQ to the data DTA in a write operation of the semiconductor memory device 401a, and may convert the data DTA to the data signal DQ from the ECC engine 550 and may transmit the data signal DQ and the data strobe signal DQS to the smart controller 210 in a read operation of the semiconductor memory device 401a.

The ECC engine 550 may perform an ECC encoding and an ECC decoding on the DTA according to a control of the control logic circuit 410.

The clock buffer 425 may receive the clock signal CK, may generate an internal clock signal ICK by buffering the clock signal CK, and may provide the internal clock signal ICK to circuit components processing the command CMD and the address ADDR.

The strobe signal generator 435 may receive the clock signal CK, may generate the data strobe signal DQS based on the clock signal CK and may provide the data strobe signal DQS to the data I/O buffer 520.

The control logic circuit 410 may control operations of the semiconductor memory device 401a. For example, the control logic circuit 410 may generate control signals for the semiconductor memory device 401a in order to perform a write operation or a read operation. The control logic circuit 410 may include a command decoder 411 that decodes the command CMD received from the smart controller 210 and a mode register 412 that sets an operation mode of the semiconductor memory device 401a.

For example, the command decoder 411 may generate the control signals corresponding to the command CMD by decoding a write enable signal, a row address strobe signal, a column address strobe signal, a chip select signal, etc.

Figure 6:
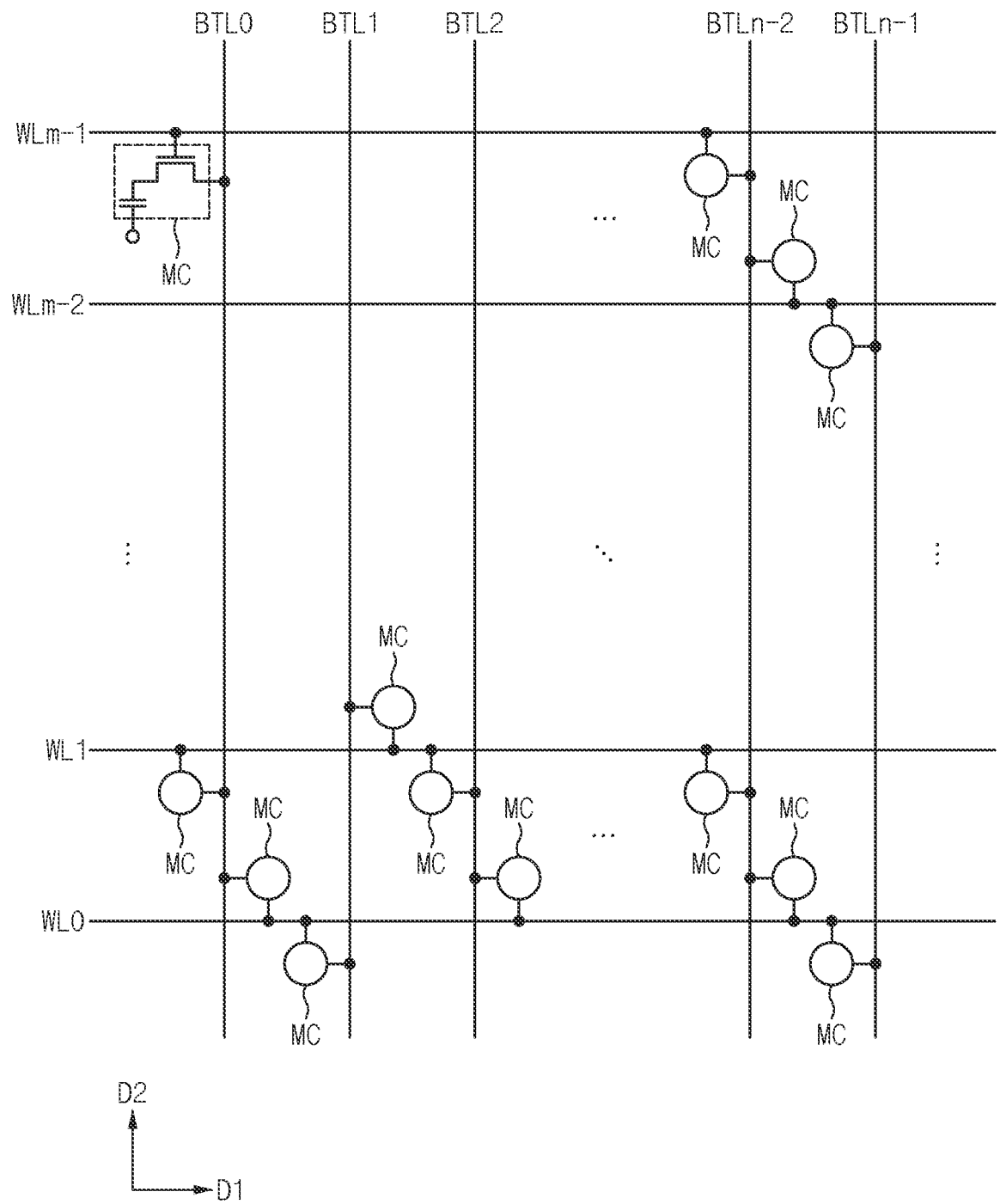
FIG. 6 illustrates an example of the first bank array in the semiconductor memory device of FIG. 5.

FIG. 6 illustrates an example of the first bank array in the semiconductor memory device of FIG. 5.

Referring to FIG. 6, the first bank array 510a may include a plurality of word-lines WL0~WLm−1 (where m is an even number equal to or greater than two), a plurality of bit-lines BTL0~BTLn−1 (where n is an even number equal to or greater than two), and a plurality of memory cells MCs provided at intersections between the word-lines WL0~WLm−1 and the bit-lines BTL0~BTLn−1.

The word-lines WL0~WLm−1 may extend in a first direction D1 and the bit-lines BTL0~BTLn−1 may extend in a second direction D2 crossing the first direction D1.

Each of the memory cells MCs includes an access (cell) transistor coupled to one of the word-lines WL0~WLm−1 and one of the bit-lines BTL0~BTLn−1 and a storage (cell) capacitor coupled to the cell transistor. That is, each of the memory cells MCs has a DRAM cell structure.

In addition, the memory cells MCs may have different arrangement depending on that the memory cells MCs are coupled to an even word-line (for example, WL0, WL2, WL4, etc.) or an odd word-line (for example, WL1, WL3, WL5, etc.). That is, a bit-line coupled to adjacent memory cells may be different depending on whether a word-line selected by an access address is an even word-line or an odd word-line. However, embodiments are not limited thereto. The memory cells MCs coupled to the even word-line (for example, WL0, WL2, WL4) and the odd word-line (for example, WL1, WL3, WL5) may have the same arrangement.

Figure 7:
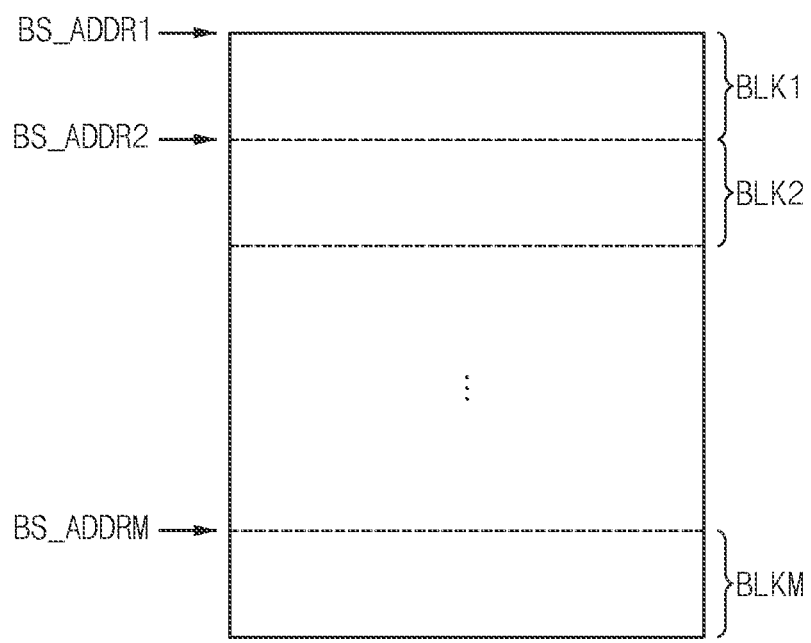
FIG. 7 illustrates an example of the memory cell array in the semiconductor memory device of FIG. 5.

FIG. 7 illustrates an example of the memory cell array in the semiconductor memory device of FIG. 5.

Referring to FIG. 7, the memory cell array 510 may be divided into a plurality of memory blocks BLK1, BLK2, . . . , BLKM. Here, M is an integer greater than two. Each of the plurality of memory blocks BLK1, BLK2, . . . , BLKM may be designated by each of base addresses BS_ADDR1, BS_ADDR2, . . . , BS_ADDRM. Each of the base addresses BS_ADDR1, BS_ADDR2, . . . , BS_ADDRM may correspond to start address of respective one of the plurality of memory blocks BLK1, BLK2, . . . , BLKM. Each of the plurality of memory blocks BLK1, BLK2, . . . , BLKM may include two or more pages.

Figure 8:
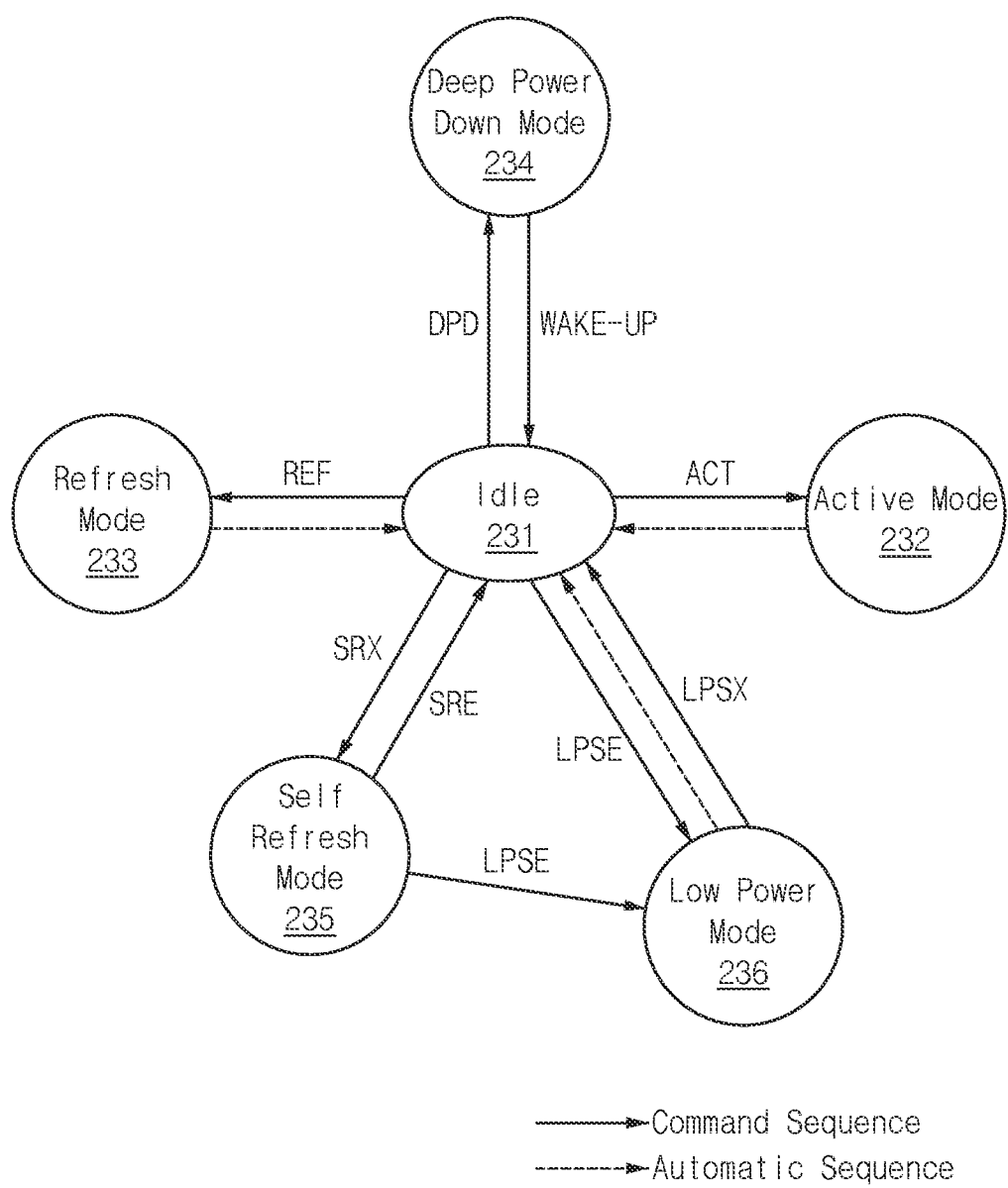
FIG. 8 illustrates an example state diagram of the semiconductor memory device of FIG. 5 according to an example embodiment.

FIG. 8 illustrates an example state diagram of the semiconductor memory device of FIG. 5 according to an example embodiment.

In FIG. 8, a state diagram of the semiconductor memory device 401a is described for example, and similar description may be applied to each of the plurality of semiconductor memory devices 402a, . . . , 40ta and 401b, 402b, . . . , 40tb.

Referring to FIG. 8, the semiconductor memory device 401a may be in one of a plurality of operation mode states. For example, the semiconductor memory device 401a may have a total of six operation mode states including an idle state 231, an active mode state 232, a refresh mode state 233, a deep power-down mode state 234, a self-refresh mode state 235 and a lower power mode state 236. Although six operation mode states are illustrated in FIG. 8, the disclosure is not limited thereto, and as such, according to other example embodiment, the semiconductor memory device 401a may have various operation mode states depending on operations of the semiconductor memory device 401a.

According to an example embodiment, the idle state 231 represents a state when the semiconductor memory device 401a does not operate. That is, when the semiconductor memory device 401a is not accessed. For example, when there is no command of the smart controller 210 (in FIG. 1), or when the smart controller 210 is in a sleep mode, the semiconductor memory device 401a may be in the idle state 231.

The active mode state 232 represents a state, in which, the semiconductor memory device 401a is performing a normal operation such as read, write and other operations in response to an active command ACT. The active mode state 232 is a state in which the semiconductor memory device 401a exhibits maximum power consumption since all circuits in the semiconductor memory device 401a are enabled. When the normal operation in the active mode state 232 is completed, the semiconductor memory device 401a may automatically transit to the idle state 231.

The refresh mode state 233 represents an auto-refresh state, in which, the semiconductor memory device 401a refreshes memory cell rows of the memory cell array 510 in response to a periodic refresh command REF applied by the smart controller 210. In the refresh mode state 233, considering that the clock signal CK of the semiconductor memory device 401a is alive and a command of the smart controller 210 may be issued to the semiconductor memory device 401a, all circuits may be enabled. Thus, power consumption in the refresh mode state 233 may be substantially the same as power consumption in the active mode state 232. When a refresh operation in the refresh mode state 233 is completed, the semiconductor memory device 401a may automatically transit to the idle state 231.

The deep power-down mode state 234 represents a deep power-down state, in which, the semiconductor memory device 401a disables most circuits in the semiconductor memory device 401a in response to a deep power-down command DPD. The deep power-down mode state 234 is a state in which the semiconductor memory device 401a exhibits minimum power consumption. In response to a wake-up command WAKE-UP, the semiconductor memory device 401a may enable the circuits, which have been disabled in the deep power-down mode state 234 and may transit to the idle state 231.

The self-refresh mode state 235 represents a self-refresh state, in which, the semiconductor memory device 401a refreshes the memory cell rows of the memory cell array 510 in response to a self-refresh entry command SRE. The self-refresh entry command SRE may be issued by the smart controller 210 in order to reduce the power consumption of the semiconductor memory device 401a, when a certain time period elapses while the semiconductor memory device 401a in in the idle state 231.

In the self-refresh mode state 235, among the circuits in the semiconductor memory device 401a, circuits directly and indirectly related to a self-refresh operation may be enabled, and the other circuits may be disabled. For example, in the self-refresh mode state 235, the clock buffer 425 receiving the clock signal CK from the smart controller 210 may be disabled. In the self-refresh mode state 235, a refresh operation may be performed by using an internal counter while the clock signal CK is disabled. Thus, power consumption in the self-refresh mode state 235 is lower than power consumption in the active mode state 232 and the refresh mode state 233 in which all of the circuits may be enabled. The semiconductor memory device 401a may exit from the self-refresh mode state 235 in response to a self-refresh exit command SRX issued by the smart controller 210.

The low power mode state 236 represents a low power-down state, in which, power consumption is lower than in the self-refresh mode state 235 although the memory cell rows of the memory cell array 510 are refreshed like in the self-refresh mode state 235. The semiconductor memory device 401a may transit from the self-refresh mode state 235 to the low power mode state 236 in response to a low power state entry command (LPSE).

In the low power mode state 236, among the circuits in the semiconductor memory device 401a, only circuits directly related to the self-refresh operation are enabled, and the other circuits may be disabled. For example, in the low power mode state 236, only circuits related to the internal counter, among the circuits enabled in the self-refresh mode state 235, may be enabled. Thus, since the lower power mode state 236, controls more circuits to be disabled than the elf-refresh mode state 235, power consumption in the low power mode state 236 may be further reduced in the self-refresh mode state 235.

When the self-refresh operation in the low power mode state 236 is completed, the semiconductor memory device 401a may automatically transit to the idle state 231. Here, the semiconductor memory device 401a may automatically exit from the low power mode state 236 according to a low power mode exit latency time that is set in the mode register 212 (in FIG. 5). The low power mode exit latency time is set so that there is no influence on the normal operation or the idle state of the semiconductor memory device 401a by controlling the semiconductor memory device 401a to exit from the low power mode state 236 early enough. The semiconductor memory device 401a may receive a valid command after the low power mode exit latency time elapses, by using the internal counter or s separate counter.

In FIG. 8, bold arrows denote a command sequence and dotted arrows denote automatic sequence.

Figure 9:
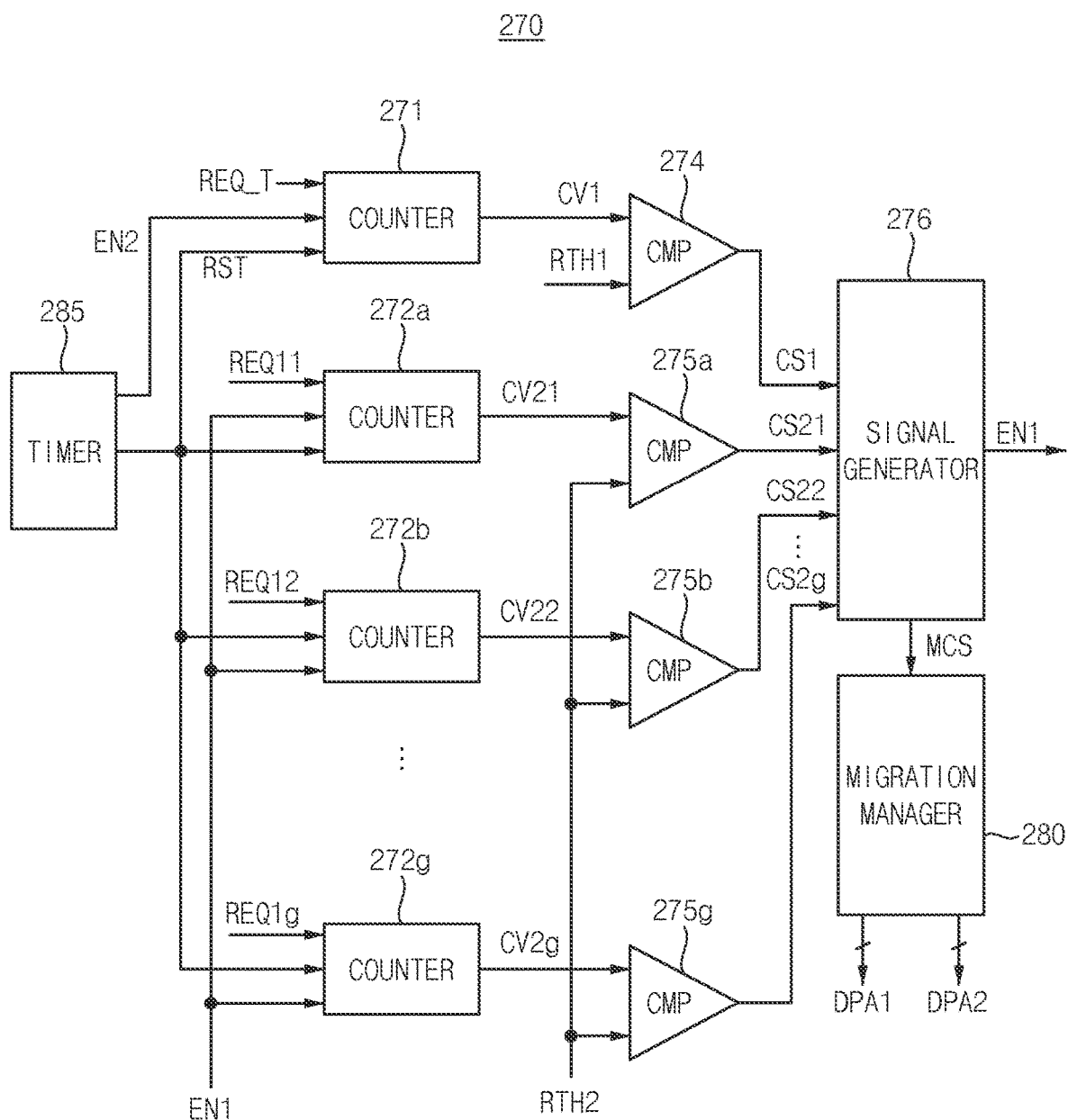
FIG. 9 is a block diagram illustrating an example of the hot/cold page profiler in the smart controller in FIG. 1 according to an example embodiment.

FIG. 9 is a block diagram illustrating an example of the hot/cold page profiler in the smart controller in FIG. 1 according to an example embodiment.

Referring to FIG. 9, the hot/cold page profiler 270 may include a first counter 271, a plurality of second counters 272a, 272b, ..., 272g, a first comparator 274, a plurality of second comparators 275a, 275b, ..., 275g, a signal generator 276, a migration manager 280 and a timer 285. Here, g is an integer greater than two.

The first counter 271 may generate a first counting signal CV1 by counting memory requests REQ_T from the at least one host of the plurality of hosts 100a, 100b, ..., 100k during the reference time interval.

The first comparator 274 may generate a first comparison signal CS1 by comparing the first counting signal with a first reference value RTH1. When the first counting signal CV1 indicates that the memory requests REQ_T is smaller than the first reference value RTH1, the first comparator 274 may generate the first comparison signal CS1 having a first logic level (a logic low level). When the first counting signal CV1 indicates that the memory requests REQ_T is equal to or greater than the first reference value RTH1, the first comparator 274 may generate the first comparison signal CS1 having a second logic level (a logic high level). According to an example embodiment, the memory requests REQ_T may be a number of memory requests.

The plurality of second counters 272a, 272b, ..., 272g may generate second counting signals CV21, CV22, ..., CV2g, respectively, by counting respective memory requests REQ11, REQ12, ..., REQ1g to pages of the plurality of memory regions during the reference time interval.

The plurality of second comparators 275a, 275b, ..., 275g may generate a plurality of second comparison signals CS21, CS22, ..., CS2g by comparing the second counting signals CV21, CV22, ..., CV2g with a second reference value RTH2, respectively.

When the second counting signals CV21, CV22, ..., CV2g indicate the each of the memory requests REQ11, REQ12, ..., REQ1g is smaller than the second reference value RTH2, the plurality of second comparators 275a, 275b, ..., 275g may generate the second comparison signals CS21, CS22, ..., CS2g having a first logic level. When the second counting signals CV21, CV22, ..., CV2g indicate the each of the memory requests REQ11, REQ12, ..., REQ1g is equal to or greater than the second reference value RTH2, the plurality of second comparators 275a, 275b, ..., 275g may generate the second comparison signals CS21, CS22, ..., CS2g having a second logic level.

The signal generator 276 may generate a first enable signal EN1 that activates the plurality of second counters 272a, 272b, ..., 272g based on the first comparison signal CS1, may provide the first enable signal EN1 to the plurality of second counters 272a, 272b, ..., 272g and may generate a migration control signal MCS further based on at least some of the plurality of second comparison signals CS21, CS22, ..., CS2g having a first logic level.

The migration manager 280 may calculate available data storage capacity of a cold rank of the first rank and the second rank for at least one of the plurality of channels CH1, CH2, ..., CHt, and may perform the data migration selectively based on the migration control signal MCS from the signal generator 276 and the available data storage capacity of the cold rank. When the migration is performed, the migration manager 280 may provide the remapping engine 300 with first physical addresses DPA1 of the cold pages of the first rank and second physical addresses DPA2 of the pages of the second rank in a channel on which the migration is performed. The remapping engine 300 may map the first physical addresses DPA1 of the cold pages of the first rank to the second physical addresses DPA2 of the pages of the second rank.

The timer 285 may apply a second enable signal EN2 to the first counter 271, which periodically activates the first counter 271 and may reset the first counter 271 and the plurality of second counters 272a, 272b, . . . , 272g by applying a reset signal to the first counter 271 and the plurality of second counters 272a, 272b, . . . , 272g after the reference time interval elapses.

Therefore, the hot/cold page profiler 270 may periodically monitor hot pages and cold pages and may perform the data migration periodically.

FIGS. 10A, 10B and 10C illustrate allocation of virtual machines by the remapping engine in the smart controller in FIG. 1, respectively, according to an example embodiment.

In FIGS. 10A, 10B and 10C, the plurality of semiconductor memory devices 401a, 402a, . . . , 40ta and 401b, 402b, . . . , 40tb may be allocated to a first rank RNK1 and a second rank RNK2 for each of the plurality of channels CH1, CH2, . . . , CHt such that each of the plurality of semiconductor memory devices 401a, 402a, . . . , 40ta and corresponding one of the plurality of semiconductor memory devices and 401b, 402b, . . . , 40tb belong to different channels.

The semiconductor memory device 401a (a first semiconductor memory device) of the semiconductor memory devices 401a and 401b connected to the channel CH1 is allocated to the first rank RNK1 and the semiconductor memory device 401b (a second semiconductor memory device) of the semiconductor memory devices 401a and 401b connected to the channel CH1 is allocated to the second rank RNK2. The semiconductor memory device 402a of the semiconductor memory devices 402a and 402b connected to the channel CH1 is allocated to the first rank RNK1 and the semiconductor memory device 402b of the semiconductor memory devices 402a and 402b connected to the channel CH2 is allocated to the second rank RNK2. The semiconductor memory device 40ta of the semiconductor memory devices 40ta and 40tb connected to the channel CHt is allocated to the first rank RNK1 and the semiconductor memory device 40tb of the semiconductor memory devices 40ta and 40tb connected to the channel CHt is allocated to the second rank RNK2.

Referring to FIG. 10A, when virtual machines VM1, VM2 and VM3 are driven in the plurality of hosts 100a, 100b, . . . , 100k, the remapping engine 300 allocates the virtual machines VM1, VM2 and VM3 to the first rank RNK1 and to a portion of the second rank RNK2 of the plurality of channels CH1, CH2, . . . , CHt for using a memory bandwidth dynamically and for reducing power consumption.

Referring to FIG. 10B, when deallocation of the virtual machine VM3 is requested from a portion of the plurality of hosts 100a, 100b, . . . , 100k, the remapping engine 300 deallocates the virtual machine VM3 from the second rank RNK2, and the power management engine 220 enters the semiconductor memory devices 401b, 402b, . . . , 40tb belonging to the second rank RNK2 into the deep power-down mode.

Referring to FIG. 10C, when allocation of the virtual machine VM5 is requested from a portion of the plurality of hosts 100a, 100b, . . . , 100k, the remapping engine 300 allocates the virtual machine VM5 to a portion of the second rank RNK2, and the power management engine 220 exits the semiconductor memory devices 401b, 402b, . . . , 40tb belonging to the second rank RNK2 from the deep power-down mode.

Figure 11:
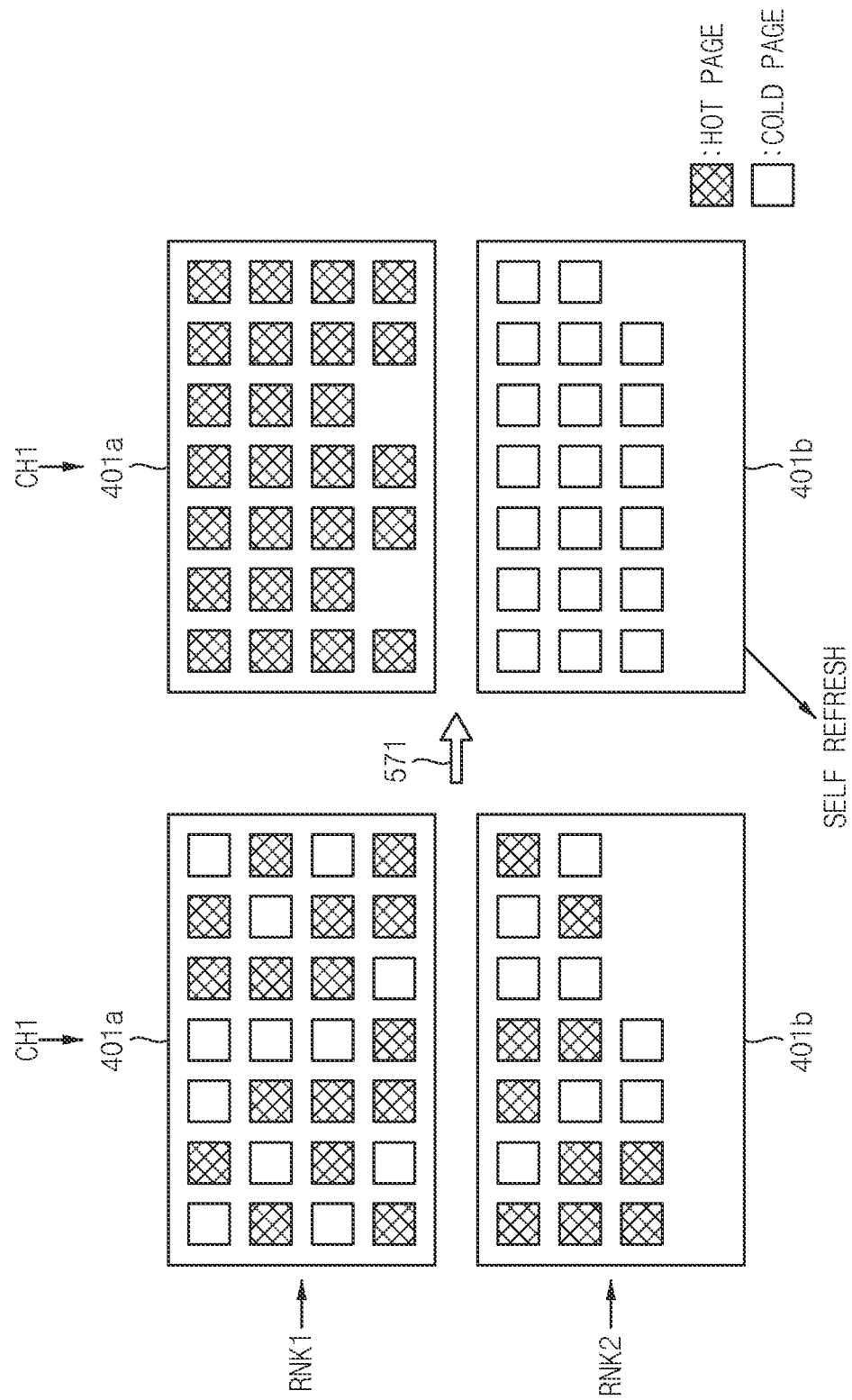
FIG. 11 illustrates an example operation of the hot/cold page profiler in the smart controller in FIG. 1 according to an example embodiment.

FIG. 11 illustrates an example operation of the hot/cold page profiler in the smart controller in FIG. 1 according to an example embodiment.

In FIG. 11, there is illustrated an operation of the hot/cold page profiler 270 on the semiconductor memory device 401a that is connected to the channel CH1 and belongs to the first rank RNK1 and the semiconductor memory device 401b that is connected to the channel CH1 and belongs to the second rank RNK2.

Referring to FIGS. 9 and 11, when the memory requests REQ_T from the at least one host of the plurality of hosts 100a, 100b, . . . , 100k during the reference time interval is smaller than the first reference value RTH1, the hot/cold page profiler 270 performs monitoring on hot pages and cold pages of the semiconductor memory device 401a in the first rank RNK1 and the semiconductor memory device 401b in the second rank RNK2, determines some pages of the semiconductor memory device 401a as cold pages when the respective memory requests to some pages of the semiconductor memory device 401a is smaller than the second reference value RTH2, determines whether available data storage capacity of the semiconductor memory device 401b in the second rank RNK2 is equal to or greater than a size of the cold pages of the semiconductor memory device 401a and performs data migration to migrate cold data of the cold pages of the semiconductor memory device 401a to free pages, which do not store data, of the semiconductor memory device 401b when available data storage capacity of the semiconductor memory device 401b in the second rank RNK2 is equal to or greater than a size of the cold pages of the semiconductor memory device 401a as a reference numeral 571 indicates.

After the data migration is completed, the power management engine 220 may enter the semiconductor memory device 401b in the second rank RNK2 into the self-refresh mode.

According to another example embodiment, when the cold pages migrated to the semiconductor memory device 401b in the second rank RNK2 are migrated to another rank (for example, a third rank), the power management engine 220 may enter the semiconductor memory device 401b in the second rank RNK2 into the deep power-down mode.

Figure 12:
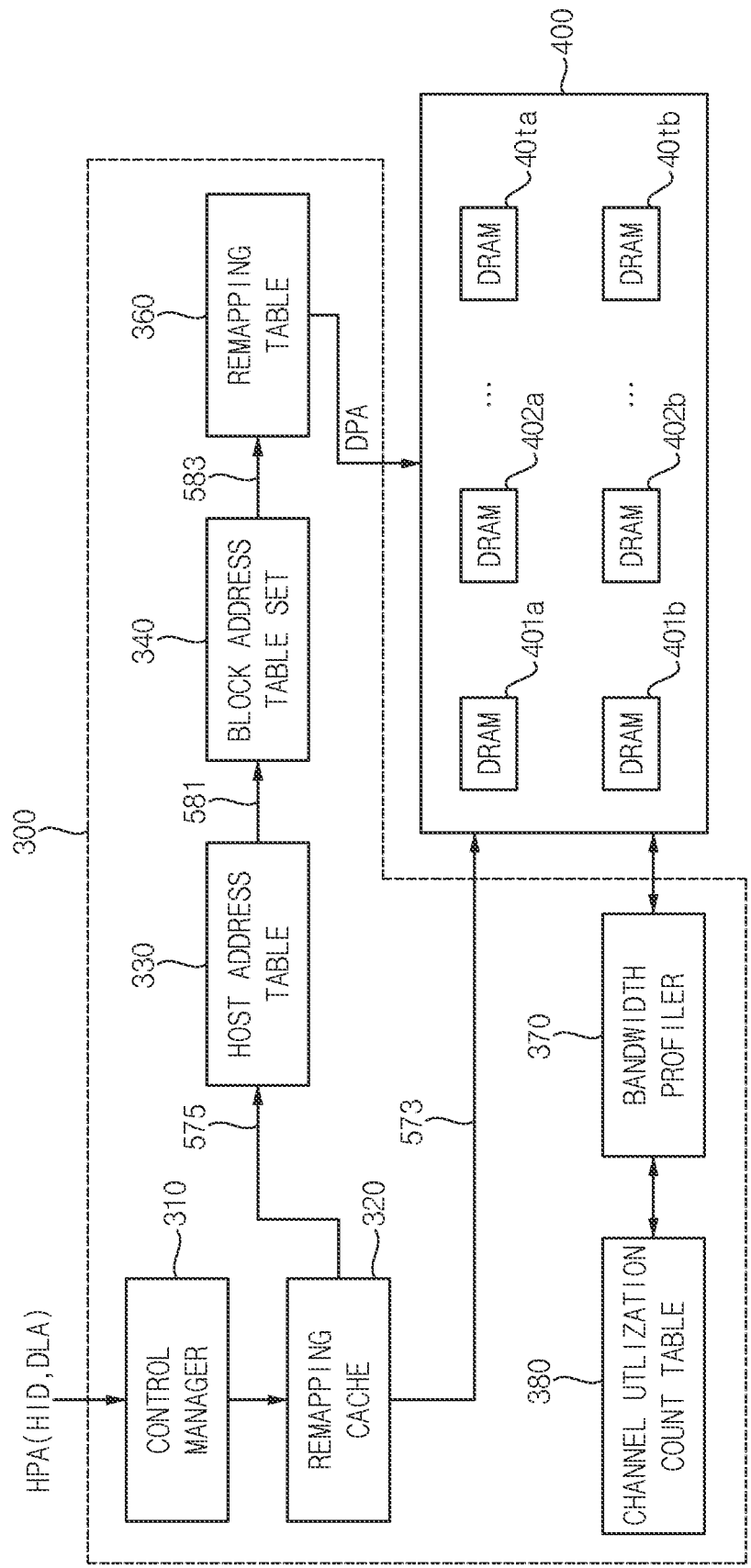
FIG. 12 is a block diagram illustrating an example of the remapping engine in the smart controller in FIG. 1 according to an example embodiment.

FIG. 12 is a block diagram illustrating an example of the remapping engine in the smart controller in FIG. 1 according to an example embodiment.

In FIG. 12, the memory resource 400 is illustrated together for convenience of explanation.

Referring to FIG. 12, the remapping engine 300 may include a control manger 310, a remapping cache 320, a host address table 330, a block address table set 340, a remapping table 360, a bandwidth profiler 370 and a channel utilization count table 380.

The remapping cache 320 may store a portion of mapping relations from among total mapping relations between host physical addresses of the plurality of hosts 100a, 100b, . . . , 100k and memory blocks of the plurality of semiconductor memory devices 401a, 402a, . . . , 40ta and 401b, 402b, . . . , 40tb.

The host address table 330 may store host block tables of the plurality of hosts 100a, 100b, . . . , 100k. The block address table set 340 may store block base addresses, each corresponding to a start address of each of the memory blocks of the plurality of semiconductor memory devices 401a, 402a, . . . , 40ta and 401b, 402b, . . . , 40tb, and the block base addresses are referred to by the host block tables, respectively. The remapping table 360 may store device physical addresses designated by the block base addresses.

The bandwidth profiler 370 may monitor utilization of memory blocks of the semiconductor memory devices 401a, 402a, . . . , 40ta and 401b, 402b, . . . , 40tb, for each channel, which is accessed by a device physical address DPA of the remapping table 360, and may record a result of the monitoring in the channel utilization count table 380 for each channel.

In response to a cache miss occurring in a first host from among the plurality of hosts 100a, 100b, . . . , 100k, the remapping engine 300 may receive a host physical address HPA including a host identifier HID to identify the first host and a device logical address DLA to access one of the plurality of semiconductor memory devices 401a, 402a, . . . , 40ta and 401b, 402b, . . . , 40tb, and may access a memory block of one of the plurality of semiconductor memory devices 401a, 402a, . . . , 40ta and 401b, 402b, 40tb based on the host identifier HID and the device logical address DLA.

The control manger 310 may search a physical address of a target memory block designated by the device logical address DLA by referring to the remapping cache 320, the host address table 330, the block address table set 340 and the remapping table 360.

For example, when a cache miss occurs in the first host from among the plurality of hosts 100a, 100b, . . . , 100k, the control manager 310 may search the physical address of the target memory block corresponding to the host identifier HID by referring to the remapping cache 320 and may access the memory resource 400 based on the searched physical address in response to a cache hit occurring the remapping cache 310 as a reference numeral 573 indicates.

In response to the cache miss occurring in the remapping cache 320, the control manager 310 may search a host block table of the first host in the host address table 330 based on the host identifier HID of the first host as a reference numeral 575 indicates, may search a block base address of the target memory block in the block address table set 340 based on the host block table of the first host as a reference numeral 581 indicates, and may obtain the physical address DPA of the target memory block in the remapping table 360 based on the block base address of the target memory block as a reference numeral 583 indicates.

Figures 13, 14:
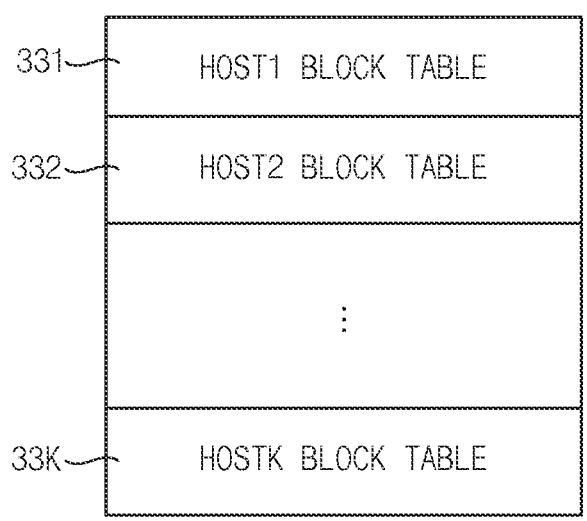
FIG. 13 illustrates an example of the remapping cache in the remapping engine in FIG. 12 according to an example embodiment.
FIG. 14 illustrates an example of the host address table in the remapping engine in FIG. 12 according to an example embodiment.

FIG. 13 illustrates an example of the remapping cache in the remapping engine in FIG. 12 according to an example embodiment.

Referring to FIG. 13, the remapping cache 320 may include a first column 321 and a second column 323. The first column 321 may store host physical addresses HPA1, HPA2, . . . , HPAr of a portion of the plurality of hosts 100a, 100b, . . . , 100k and the second column 323 may store device physical addresses DPA1, DPA2, . . . , DPAr corresponding to the host physical addresses HPA1, HPA2, . . . , HPAr. Here, r is an integer greater than two.

FIG. 14 illustrates an example of the host address table in the remapping engine in FIG. 12 according to an example embodiment.

Referring to FIG. 14, the host address table 330 may include a plurality of rows 331, 332, . . . , 33K, and each of the plurality of rows 331, 332, . . . , 33K may store respective one of host block tables HOST1 BLOCK TABLE, HOST2 BLOCK TABLE, . . . , HOSTK BLOCK TABLE of the plurality of hosts 100a, 100b, . . . , 100k, which may be designated by the host identifier HID.

Figure 15:
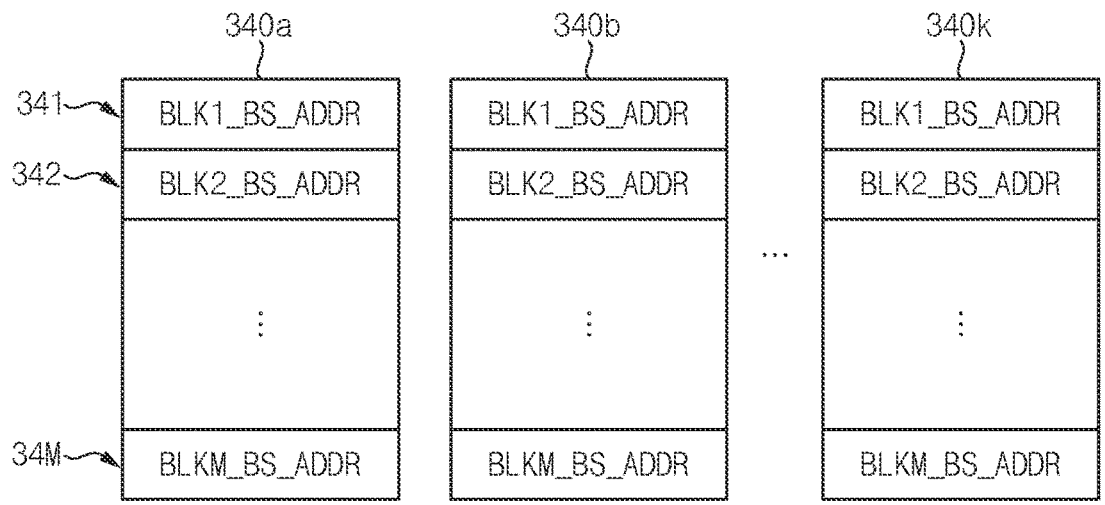
FIG. 15 illustrates an example of the block address table set in the remapping engine in FIG. 12 according to an example embodiment.

FIG. 15 illustrates an example of the block address table set in the remapping engine in FIG. 12 according to an example embodiment.

Referring to FIG. 15, the block address table set 340 may include a plurality of block address tables 340a, 340b, . . . , 340k corresponding to the host block tables HOST1 BLOCK TABLE, HOST2 BLOCK TABLE, . . . , HOSTK BLOCK TABLE in FIG. 14.

Each of the plurality of block address tables 340a, 340b, . . . , 340k may include a plurality of rows 341, 342, . . . , 34M and each of the plurality of rows 341, 342, . . . , 34M may store respective one of block base addresses BLK1_BS_ADDR, BLK2_BS_ADDR, . . . , BLKM_BS_ADDR, each corresponding to a start address of each of the memory blocks of the plurality of semiconductor memory devices 401a, 402a, . . . , 40ta and 401b, 402b, . . . , 40tb, and the block base addresses BLK1_BS_ADDR, BLK2_BS_ADDR, . . . , BLKM_BS_ADDR are referred to by the host block tables HOST1 BLOCK TABLE, HOST2 BLOCK TABLE, . . . , HOSTK BLOCK TABLE, respectively.

Figure 16:
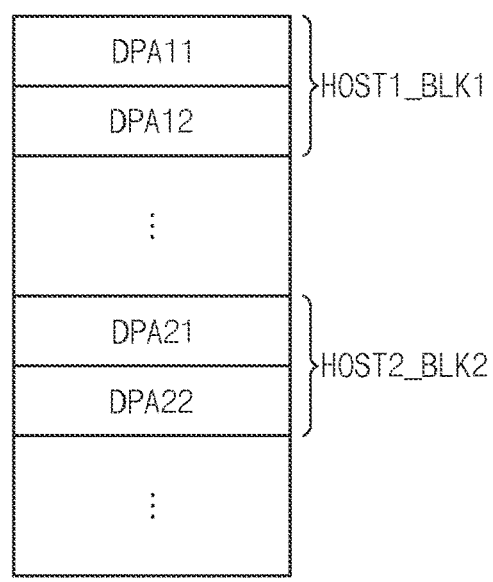
FIG. 16 illustrates an example of the remapping table in the remapping engine in FIG. 12 according to an example embodiment.

FIG. 16 illustrates an example of the remapping table in the remapping engine in FIG. 12 according to an example embodiment.

referring to FIG. 16, the remapping cache 360 may store may store device physical addresses DPA11, DPA12, . . . , DPA21, DPA22, . . . which are designated by the block base addresses BLK1_BS_ADDR, BLK2_BS_ADDR, . . . , BLKM_BS_ADDR. The device physical addresses DPA11 and DPA12 may correspond to a host block HOST1_BLK1 and the device physical addresses DPA21 and DPA22 may correspond to a host block HOST2_BLK2.

Figure 17:
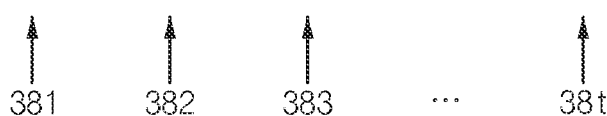
FIG. 17 illustrates an example of the channel utilization count table in the remapping engine in FIG. 12 according to an example embodiment.

FIG. 17 illustrates an example of the channel utilization count table in the remapping engine in FIG. 12 according to an example embodiment.

Referring to FIG. 17, the channel utilization count table 380 may include a plurality of columns 381, 382, 383, . . . , 38t.

The column 381 may store host identifiers HID1, HID2, . . . , HIDK for identifying the plurality of hosts 100a, 100b, . . . , 100k, respectively.

The columns 382, 383, . . . , 38t may store channel utilization count values for each of the channels CH1, CH2, . . . , CHt with respect to plurality of hosts 100a, 100b, . . . , 100k.

The column 382 may store channel utilization count values UT11, UT21, . . . , UTK1 for the channel CH1 with respect to plurality of hosts 100a, 100b, . . . , 100k. The column 383 may store channel utilization count values UT12, UT22, . . . , UTK2 for the channel CH2 with respect to plurality of hosts 100a, 100b, . . . , 100k. The column 38t may store channel utilization count values UT1t, UT2t, . . . , UTKt for the channel CHt with respect to plurality of hosts 100a, 100b, . . . , 100k.

Figure 18:
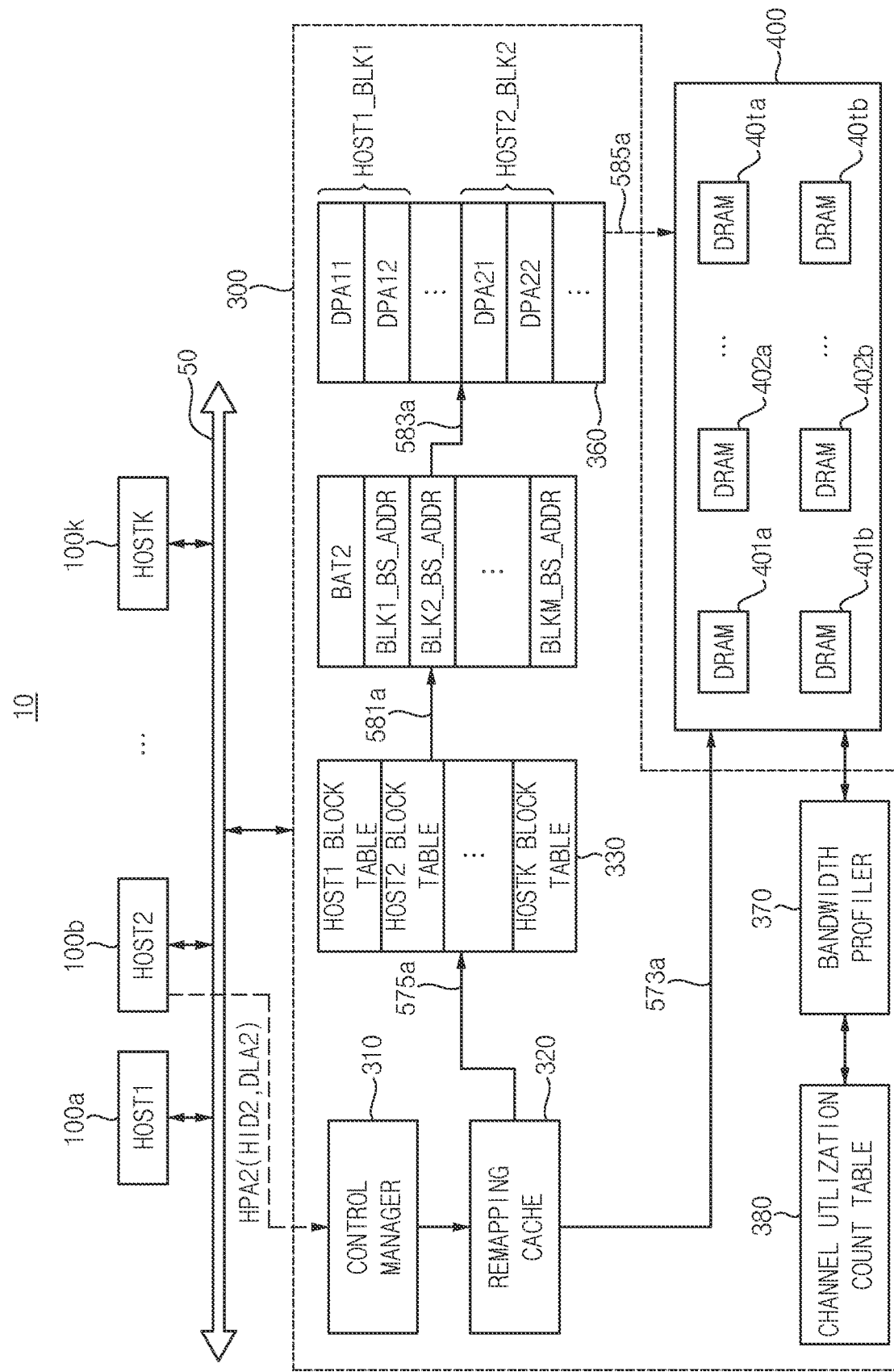
FIG. 18 illustrates an example operation of the computing system of FIG. 1 according to an example embodiment.

FIG. 18 illustrates an example operation of the computing system of FIG. 1 according to an example embodiment.

In FIG. 18, it is assumed that a cache miss occurs in the host 100b from among the plurality of hosts 100a, 100b, . . . , 100k.

Referring to FIGS. 1 and 2 through 18, when the cache miss occurs in the host 100b, the host 100b may provide the remapping engine 300 with a host physical address HPA2 including a host identifier HID2 of the host 100b and a device logical address DLA2 through the CXL bus 50.

The control manager 310 may search the physical address of the target memory block corresponding to the host identifier HID2 by referring to the remapping cache 320 and may access the memory resource 400 based on the searched physical address in response to a cache hit occurring the remapping cache 320. For example, as indicated by a reference numeral 573a, the control manager 310 may access the memory resource 400 based on the searched physical address in response to a cache hit occurring the remapping cache 310.

In response to the cache miss occurring in the remapping cache 320, the control manager 310 may search the host block table HOST2 BLOCK TABLE of the host 100b in the host address table 330 based on the host identifier HID2 of the host 100b as indicated by a reference numeral 575a, may search a block base address BLK2_BS_ADDR of the target memory block in a block address table BAT2 in the block address table set 340 based on the host block table HOST2 BLOCK TABLE of the host 100b as indicated by a reference numeral 581a, may obtain a physical address DPA22 of the target memory block in the remapping table 360 based on the block base address BLK2_BS_ADDR of the target memory block as a reference numeral 583a indicates and may access the memory resource 400 based on the a physical address DPA22 as indicated by a reference numeral 585a.

Figure 19:
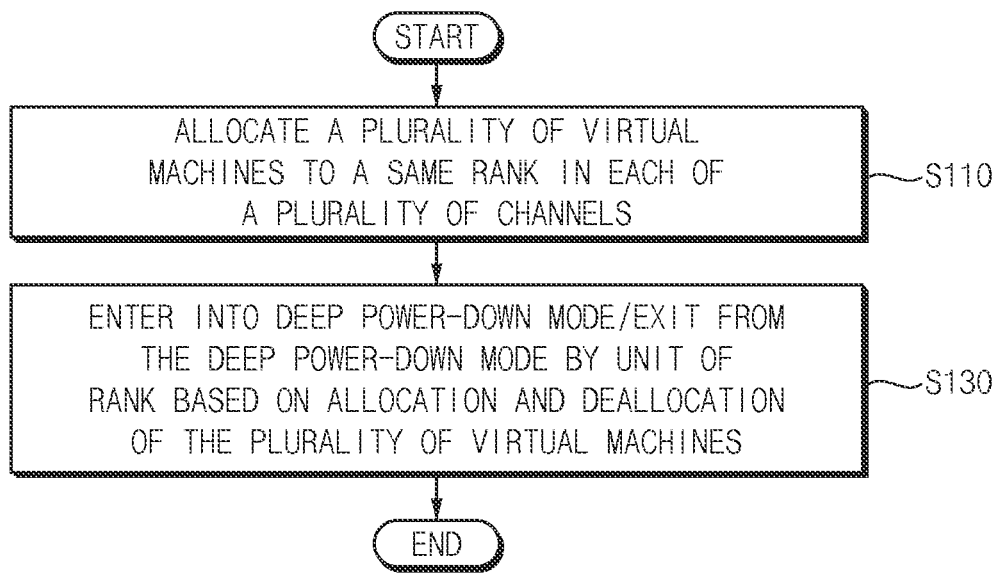
FIG. 19 is a flow chart illustrating a method of operating a memory system according to an example embodiment.

FIG. 19 is a flow chart illustrating a method of operating a memory system according to an example embodiment.

Referring to FIGS. 1, 10A, 10B, 10C and 19, there is provided a method of operating a memory system 200 that includes smart controller 210 and a memory resource 400. The memory resource 400 includes a plurality of semiconductor memory devices DRAMs 401a, 402a, . . . , 40ta and 401b, 402b, . . . , 40tb connected to each other through an internal bus IBUS. The smart controller 210 may be connected to the plurality of semiconductor memory devices 401a, 402a, . . . , 40ta and 401b, 402b, . . . , 40tb through a plurality of channels CH1, CH2, . . . , CHt. The plurality of semiconductor memory devices 401a, 402a, . . . , 40ta and 401b, 402b, 40tb are divided into a first semiconductor memory and a second semiconductor memory belonging to different ranks for each of the plurality of channels CH1, CH2, . . . , CHt. The smart controller 210 may be connected to the plurality of hosts 100a, 100b, . . . , 100k through a CXL bus 50 and controls the plurality of semiconductor memory devices 401a, 402a, . . . , 40ta and 401b, 402b, 40tb by communicating a plurality of hosts 100a, 100b, . . . , 100k driving at least one virtual machine, respectively, through the CXL interface.

According to the method, the remapping engine 300 in the smart controller 210 allocates the virtual machines VM1, VM2 and VM3 to a same rank of the plurality of channels CH1, CH2, . . . , CHt (operation S110).

The power management engine 220 in the smart controller 210 may control a power mode of the memory resource 400 at a rank level based on allocation and deallocation of additional virtual machine (operation S130).

Figure 20:
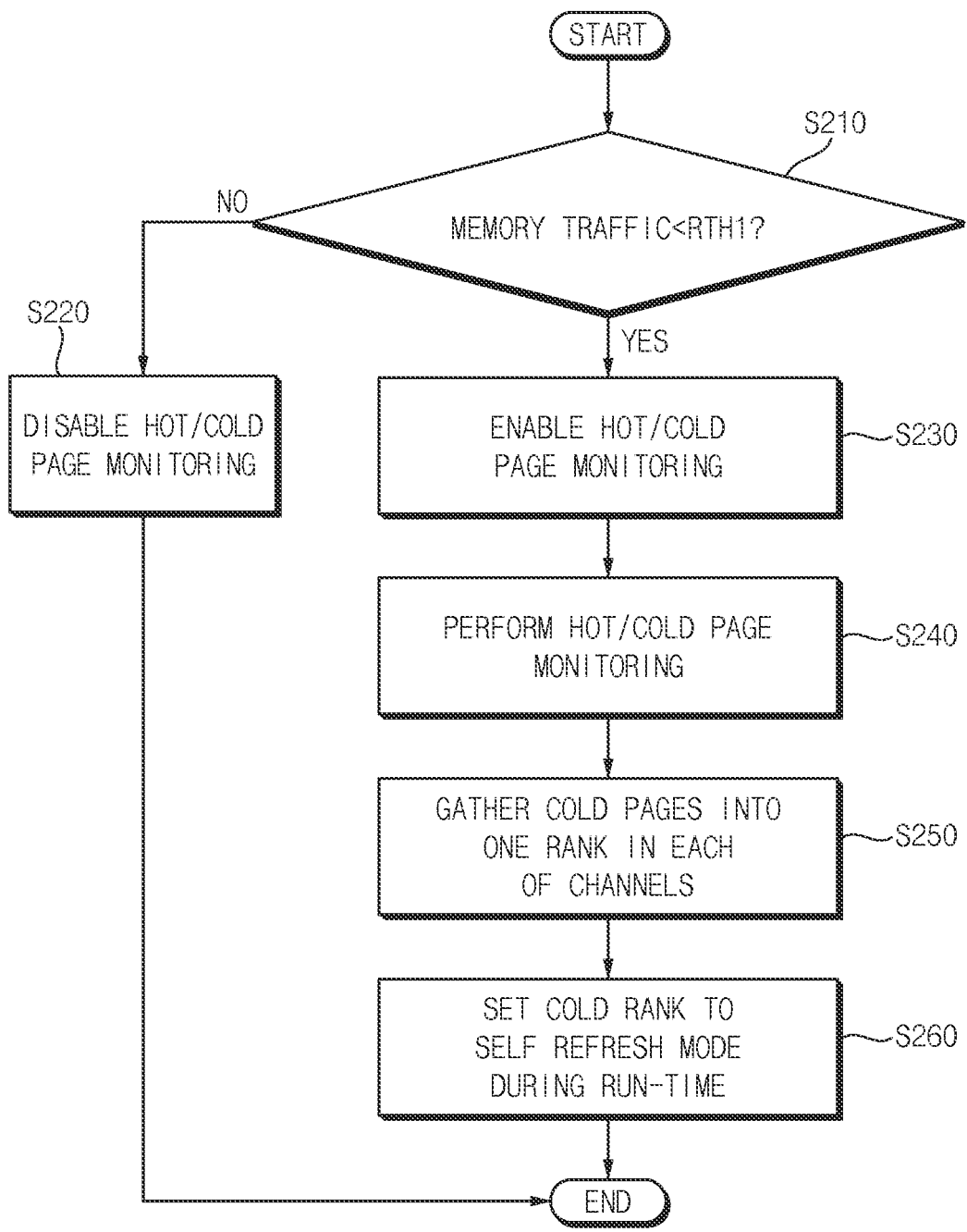
FIG. 20 is a flow chart illustrating a method of operating a memory system according to an example embodiment.

FIG. 20 is a flow chart illustrating a method of operating a memory system according to an example embodiment.

Referring to FIGS. 1, 8, 9, 11 and 20, there is provided a method of operating a memory system 200 that includes smart controller 210 and a memory resource 400. The memory resource 400 includes a plurality of semiconductor memory devices DRAMs 401a, 402a, . . . , 40ta and 401b, 402b, . . . , 40tb connected to each other through an internal bus IBUS. The smart controller 210 may be connected to the plurality of semiconductor memory devices 401a, 402a, . . . , 40ta and 401b, 402b, . . . , 40tb through a plurality of channels CH1, CH2, . . . , CHt. The plurality of semiconductor memory devices 401a, 402a, . . . , 40ta and 401b, 402b, . . . , 40tb are divided into a first semiconductor memory and a second semiconductor memory belonging to different ranks for each of the plurality of channels CH1, CH2, . . . , CHt. The smart controller 210 may be connected to the plurality of hosts 100a, 100b, . . . , 100k through a CXL bus 50 and controls the plurality of semiconductor memory devices 401a, 402a, . . . , 40ta and 401b, 402b, 40tb by communicating a plurality of hosts 100a, 100b, . . . , 100k driving at least one virtual machine, respectively, through the CXL interface.

According to an example embodiment, the method includes determining whether memory requests REQ_T from the at least one host of the plurality of hosts 100a, 100b, . . . , 100k during the reference time interval is smaller than a first reference value RTH1 (operation S210). According to an example embodiment, the hot/cold page profiler 270 in the smart controller 210 may determine whether the memory requests REQ_T from the at least one host of the plurality of hosts 100a, 100b, . . . , 100k during the reference time interval is smaller than a first reference value RTH1 (operation S210)

In operation (S220), when the memory requests REQ_T from the at least one host is equal to or greater than the first reference value RTH1 (NO in operation S210), the hot/cold page profiler 270 disables hot/cold page monitoring.

In operation (S230), when the memory requests REQ_T from the at least one host is smaller than the first reference value RTH1 (YES in operation S210), the hot/cold page profiler 270 enables hot/cold page monitoring.

In operation (S240), the hot/cold page profiler 270 performs hot/cold page monitoring om memory regions of the plurality of semiconductor memory devices 401a, 402a, . . . , 40ta and 401b, 402b, . . . , 40tb by using the a plurality of second counters 272a, 272b, 272g and a plurality of second comparators 275a, 275b, . . . , 275g.

In operation (S250), the migration manager 280 in the hot/cold page profiler 270 gathers cold pages into one rank (cold rank) in each of the plurality of channels CH1, CH2, . . . , CHt based on a result of the hot/cold page monitoring.

In operation (S260), the power management engine 220 in the smart controller 210 sets the cold rank to a self-refresh mode during a run-time.

As mentioned above, the smart controller in the memory system and the computing system according to an example embodiment, allocates virtual machines to the plurality of semiconductor memory devices 401a, 402a, . . . , 40ta and 401b, 402b, . . . , 40tb at a rank level, enters a rank, to which the virtual machines are not allocated, to a deep power-down mode, divides memory regions of the plurality of semiconductor memory devices 401a, 402a, . . . , 40ta and 401b, 402b, . . . , 40tb into hot pages and cold pages based on memory requests on the plurality of semiconductor memory devices 401a, 402a, . . . , 40ta and 401b, 402b, . . . , 40tb, migrates cold data of cold pages of one rank to another rank and enters a cold rank including the cold pages into a self-refresh mode, and thus controls the power mode of the memory resource 400 at a rank level.

Figure 21:
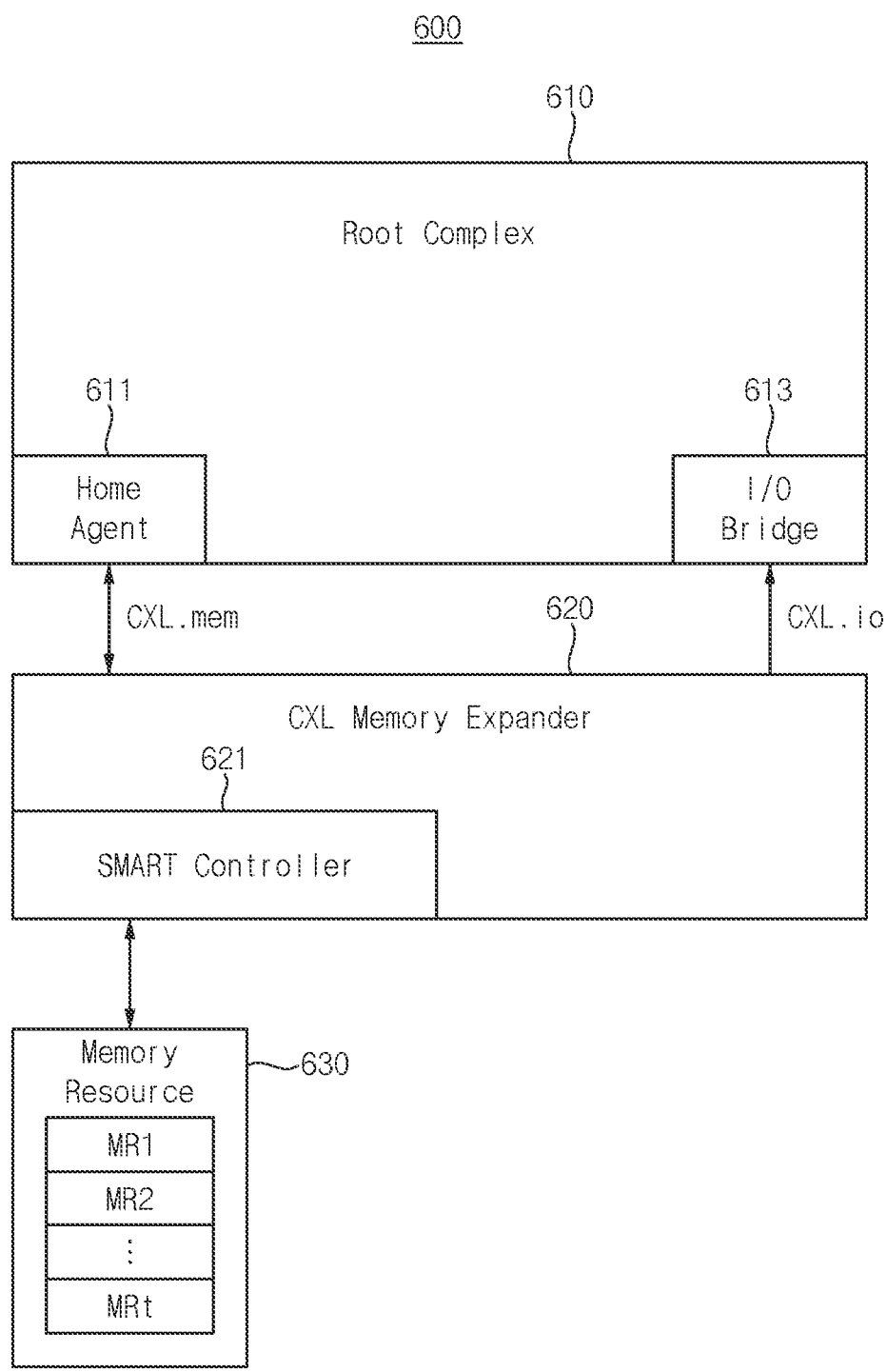
FIG. 21 is an example of a computing system when a memory system according to an example embodiment corresponds to a Type 3 memory system defined by a CXL protocol.

FIG. 21 is an example of a computing system when a memory system according to an example embodiment corresponds to a Type 3 memory system defined by a CXL protocol.

Referring to FIG. 21, a computing system 600 may include a root complex 610, a CXL memory expander 620 connected to the root complex 610 and a memory resource 630.

The root complex 610 may include a home agent 611 and an I/O bridge 613, and the home agent 610 may communicate with the CXL memory expander 620 based on a coherent protocol CXL.mem the I/O bridge 613 may communicate with the CXL memory expander 620 based on a non-coherent protocol, i.e., an I/O protocol CXL.io. In a CXL protocol base, the home agent 610 may correspond to an agent on a host side that is arranged to solve the entire consistency of the computing system 600 for a given address.

The CXL memory expander 620 may include a smart controller 621 and the smart controller 621 may employ the smart controller 210 in FIG. 1.

In addition, the CXL memory expander 620 may output data to the root complex 610 via the I/O bridge 613 based on the I/O protocol CXL.io or the PCIe.

The memory resource 630 may include a plurality of memory regions MR1, MR2, . . . , MRt and each of the plurality of memory regions MR1, MR2, . . . , MRt may be implemented as a memory of a various units.

Figure 22:
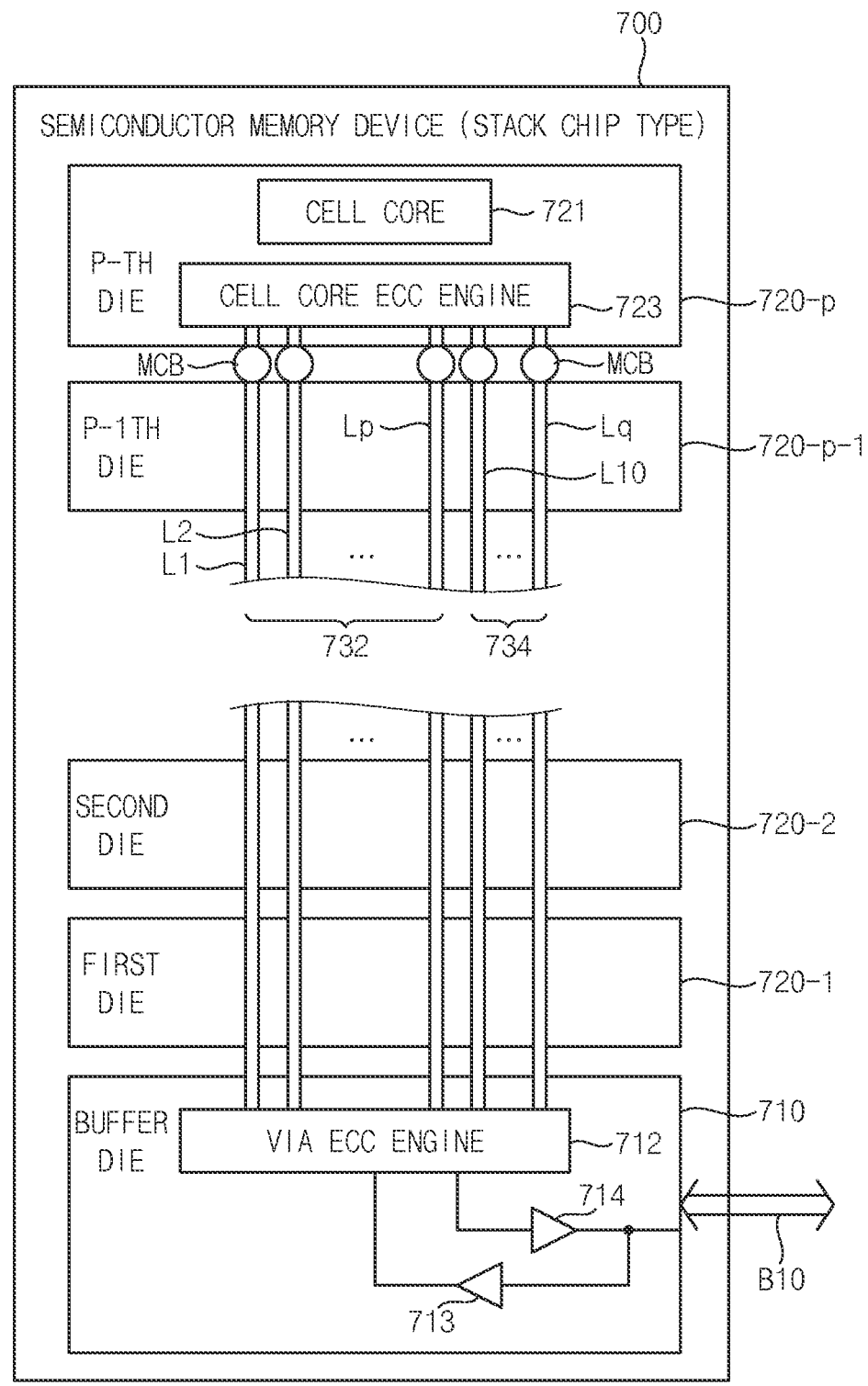
FIG. 22 is a block diagram illustrating a semiconductor memory device according to an example embodiment.

FIG. 22 is a block diagram illustrating a semiconductor memory device according to an example embodiment.

Referring to FIG. 22, a semiconductor memory device 700 may include at least one buffer die 710 and a plurality of memory dies 720-1 to 720-p (p is a natural number equal to or greater than three) providing a soft error analyzing and correcting function in a stacked chip structure.

The plurality of memory dies 720-1 to 720-p are stacked on the buffer die 710 and conveys data through a plurality of through silicon via (TSV) lines.

Each the memory dies 720-1 to 720-p may include a cell core 721 to store data and a cell core ECC engine 723 which generates transmission parity bits (i.e., transmission parity data) based on transmission data to be sent to the at least one buffer die 710. The cell core 721 may include a plurality of memory cells having DRAM cell structure.

The buffer die 710 may include a via ECC engine 712 which corrects a transmission error using the transmission parity bits when a transmission error is detected from the transmission data received through the TSV liens and generates error-corrected data.

The buffer die 711 may further include a receiver 713 and a transmitter 714.

The semiconductor memory device 700 may be a stack chip type memory device or a stacked memory device which conveys data and control signals through the TSV lines. The TSV lines may be also called 'through electrodes'.

The cell core ECC engine 723 may perform error correction on data which is outputted from the memory die 720-p before the transmission data is sent.

A transmission error which occurs at the transmission data may be due to noise which occurs at the TSV lines. Since data fail due to the noise occurring at the TSV lines may be distinguishable from data fail due to a false operation of the memory die, it may be regarded as soft data fail (or a soft error). The soft data fail may be generated due to transmission fail on a transmission path, and may be detected and remedied by an ECC operation.

With the above description, a data TSV line group 732 which is formed at one memory die 720-p may include TSV lines L1 and L2 to Lp, and a parity TSV line group 734 may include TSV lines L10 to Lq.

The TSV lines L1 and L2 to Lp of the data TSV line group 732 and the parity TSV lines L10 to Lq of the parity TSV line group 734 may be connected to micro bumps MCB which are correspondingly formed among the memory dies 720-1 to 720-p.

At least one of the memory dies 720-1 to 720-p may include DRAM cells each including at least one access transistor and one storage capacitor.

The semiconductor memory device 700 may have a three-dimensional (3D) chip structure or a 2.5D chip structure to communicate with the host through a data bus B10.

The buffer die 710 may be connected with the memory controller through the data bus B10.

The cell core ECC engine 723 may output transmission parity bits as well as the transmission data through the parity TSV line group 734 and the data TSV line group 732 respectively. The outputted transmission data may be data which is error-corrected by the cell core ECC engine 723.

The via ECC engine 712 may determine whether a transmission error occurs at the transmission data received through the data TSV line group 732, based on the transmission parity bits received through the parity TSV line group 734. When a transmission error is detected, the via ECC engine 712 may correct the transmission error on the transmission data using the transmission parity bits. When the transmission error is uncorrectable, the via ECC engine 712 may output information indicating occurrence of an uncorrectable data error.

The semiconductor memory device 700 is a high data storage capacity memory and each of the plurality of semiconductor memory devices 401a, 402a, . . . , 40ta and 401b, 402b, . . . , 40tb may include the semiconductor memory device 700 of FIG. 22.

Figure 23:
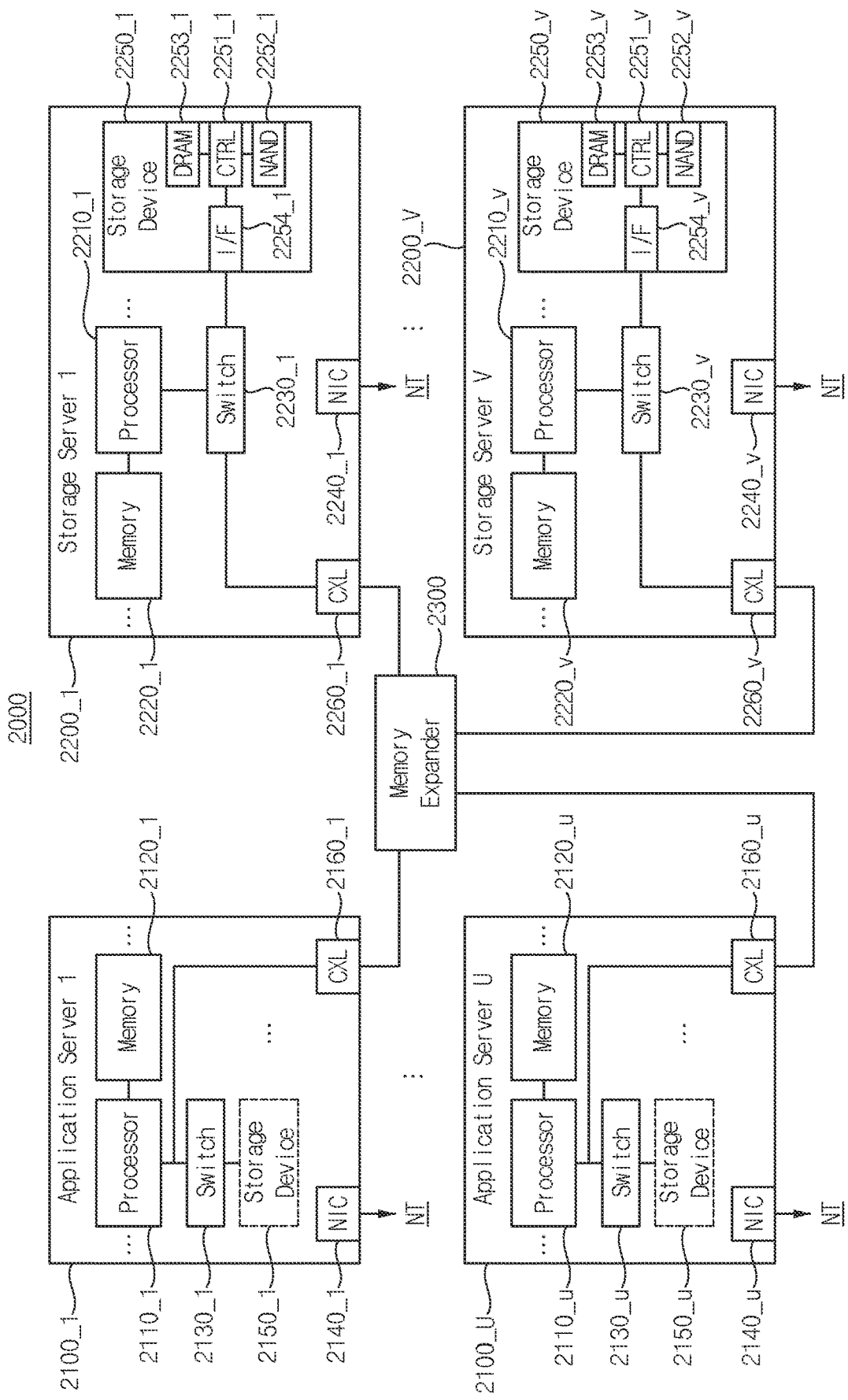
FIG. 23 is a block diagram illustrating a data center including a computing system according to an example embodiment.

FIG. 23 is a block diagram illustrating a data center including a computing system according to an example embodiment.

Referring to FIG. 23, a data center 2000 may be a facility that collects various types of data and provides various services, and may be referred to as a data storage center. The data center 2000 may be a system for operating search engines and databases, and may be a computing system used by companies such as banks or government agencies. The data center 2000 may include application servers 2100_1 to 2100_U and storage servers 2200_1 to 2200_V. The number of the application servers 2100_1 to 2100_U and the number of the storage servers 2200_1 to 2200_V may be variously selected according to an example embodiment, and the number of the application servers 2100_1 to 2100_U and the number of the storage servers 2200_1 to 2200_V m may be different from each other.

Below, for convenience of description, an example of the storage server 2200_1 will be described.

The storage server 2200_1 may include a processor 2210_1, a memory 2220_1, a switch 2230_1, a network interface controller (NIC) 2240_1, a storage device 2250_1 and CXL interface 2250_1. The storage server 2200_V may include a processor 2210_v, a memory 2220_v, a switch 2230_v, a NIC 2240_v, a storage device 2250_v and CXL interface 2250_v.

The processor 2210_1 may control overall operation of the storage server 2200_1. The memory 2220_1 may store various instructions or data under control of the processor 2210_1. The processor 2210_1 may be configured to access the memory 2220_1 to execute various instructions or to process data. In an embodiment, the memory 2220_1 may include at least one of various kind of memory devices such as double data rate synchronous DRAM (DDR SDRAM), high bandwidth memory (HBM), hybrid memory cube (HMC), dual in-line memory module (DIMM), Optane DIMM or non-volatile DIMM.

In an embodiment, the number of the processors 2210_1 included in the storage server 2200_1 and the number of the memories 2220_1 included in the storage server 2200_1 may be variously changed or modified. In an embodiment, the processor 2210_1 and the memory 2220_1 included in the storage server 2200_1 may constitute a processor-memory pair and the number of processor-memory pairs included in the storage server 2200_1 maybe variously changed or modified. In an embodiment, the number of the processors 2210_1 included in the storage server 2200_1 and the number of the memories 2220_1 included in the storage server 2200_1 may be different. The processor 2210_1 may include a single core processor and a multi-core processor.

Under control of the processor 2210_1, the switch 2230_1 may selectively connect the processor 2210_1 and the storage device 2250_1 or may selectively connect the NIC 2240-1, the storage device 2250_1 and the CXL 2240_1.

The NIC 2240_1 may connect the storage server 2220_1 with a network NT. The NIC 2240_1 may include a network interface card, a network adapter, and the like. The NIC 2240_1 may be connected to the network NT through a wired interface, a wireless interface, a Bluetooth interface, or an optical interface. The MC 2240_1 may include an internal memory, a digital signal processor (DSP), a host bus interface, and the like and may be connected with the processor 2210_1 or the switch 2230_1 through the host bus interface. The host bus interface may include at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, etc. In an embodiment, the NIC 2240_1 may be integrated with at least one of the processor 2210_1, the switch 2230_1 and the storage device 2250_1.

Under control of the processor 2210_1, the storage device 2250_1 may store data or may output the stored data. The storage device 2250_1 may include a controller CTRL 2251_1, a nonvolatile memory NAND 2252_1, a DRAM 2253_1 and an interface I/F 2254_1. In an embodiment, the storage device 2250_1 may further include a secure element SE for security or privacy. The storage device 2250_$v$ may include a controller CTRL 2251_$v$, a nonvolatile memory NAND 2252_$v$, a DRAM 2253_$v$ and an interface I/F 2254_$v$. In an embodiment, the storage device 2250_$v$ may further include a secure element SE for security or privacy.

The controller 2251_1 may control overall operation of the storage device 2250_1. The controller 2251_1 may include an SRAM. In response to signals received through the interface 2254_1, the controller 2251_1 may store data in the nonvolatile memory 2252_1 or may output data stored in the nonvolatile memory 2252_1. The controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary of the controller 2251_1 to operate. The interface 2254_1 may provide a physical connection between the controller 2251_1 and the processor 2210_1, the switch 2230_1 or the NIC 2240_1. The interface 2254_1 may be implemented to support direct-attached storage (DAS) manner that allows the direct connection of the storage device 2250_1 through a dedicated cable. The interface 2254_1 may be implemented based on at least one of various above-described interfaces through a host interface bus.

The above components of the storage server 2200_1 are provided as an example, and the disclosure is not limited thereto. The above components of the storage server 2200_1 may be applied to each of the other storage servers or each of the application servers 2100_1 to 2100_U. In each of the application servers 2100_1 to 2100_U, a storage device 2150_1 may be selectively omitted.

The application server 2100_1 may include a processor 2110_1, a memory 2120_1, a switch 2130_1, a NIC 2140_1, and CXL interface 2160_1. The application server 2100_U may include a processor 2110_$u$, a memory 2120_$u$, a switch 2130_$u$, a NIC 2140_1, and CXL interface 2160_$u$.

The application servers 2100_1 to 2100_U and the storage servers 2200_1 to 2200_V may communicate with each other through the network NT. The network NT may be implemented using a fiber channel (FC) or an Ethernet. The FC may be a medium used for a relatively high speed data transmission, and an optical switch that provides high performance and/or high availability may be used. The storage servers 2200_1 to 2200_V may be provided as file storages, block storages or object storages according to an access scheme of the network 3300.

In some an example embodiment, the network NT may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other an example embodiment, the network NT may be a general network such as the TCP/IP network. For example, the network NT may be implemented according to at least one of protocols such as an FC over Ethernet (FCoE), a network attached storage (NAS), a nonvolatile memory express (NVMe) over Fabrics (NVMe-oF), etc.

In an example embodiment, at least one of the plurality of application servers 2100_1 to 2100_U may be configured to access at least one of the remaining application servers or at least one of the storage servers 2200_1 to 2200_V over the network NT.

For example, the application server 2100_1 may store data requested by s user or a client in at least one of the storage servers 2200_1 to 2200_V over the network NT. Alternatively, the application server 2100_1 may obtain data requested by s user or a client in at least one of the storage servers 2200_1 to 2200_V over the network NT. In this case, the application server 2100_1 may be implemented with a web server, a database management system (DBMS), or the like.

The application server 2100_1 may access a memory 2120_1 or a storage device 2105_1 of the application server 2100_1 or the storage device 2250_1 of the storage server 2000_1 over the network NT. As such, the application server 2100_1 may perform various operations on data stored in the application servers 2100_1 to 2100_U and/or the storage servers 2200_1 to 2200_V. For example, the application server 2100_1 may execute a command for moving or copying data between the application servers 2100_1 to 2100_U and/or the storage servers 2200_1 to 2200_V. The data may be transferred from the storage devices 2250_1 to 2250_$v$ of the storage servers 2200_1 to 2200_V to the memories 2120_1 to 2120_$u$ of the application servers 2100_1 to 2100_U directly or through the memories 2220_1 to 2220_$v$ of the storage servers 2200_1 to 2200_V. For example, the data transferred through the network NT may be encrypted data for security or privacy.

The storage servers 2200_1 to 2200_V and the application servers 2100_1 to 2100_U may be connected with a memory expander 2300 through the CXL interfaces 2260_1 to 2260_v and 2160_1 to 2160_u. The memory expander 2300 may be used as expanded memory of each of the storage servers 2200_1 to 2200_V and the application servers 2100_1 to 2100_U or virtualized component included therein may communicate with each other through the CXL interfaces 2260_1 to 2260_v and 2160_1 to 2160_u and the memory expander 2300.

The disclosure may be applied to various electronic devices and systems that include high storage capacity memory devices. For example, the disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of an example embodiment and is not to be construed as limiting thereof. Although a few an example embodiment have been described, those skilled in the art will readily appreciate that many modifications are possible in the an example embodiment without materially departing from the novel teachings and advantages of the disclosure. Accordingly, all such modifications are intended to be included within the scope of the disclosure as defined in the claims.

What is claimed is:

1. A memory system comprising:
   a memory resource comprising a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and
   a controller connected to the plurality of semiconductor memory devices through the plurality of channels, the controller configured to control the plurality of semiconductor memory devices based on communication with a plurality of hosts through a compute express link (CXL) interface, each of the plurality of hosts configured to drive at least one virtual machine,
   wherein the controller is configured to control a power mode of the memory resource by managing an idle memory region from among a plurality of memory regions of the plurality of semiconductor memory devices at a rank level without intervention of the plurality of hosts, the plurality of memory regions configured to store data.

2. The memory system of claim 1, wherein the idle memory region corresponds to a memory region that does not store the data, from among plurality of memory regions, or a memory region that has a data access frequency smaller than a reference frequency during a reference time interval.

3. The memory system of claim 1, wherein the controller comprises:
   a hot/cold page profiler, based on a total memory traffic requested from at least one host, from among the plurality of hosts, being smaller than a first reference value, configured to:
      monitor a cold page and a hot page from among a plurality of pages of the plurality of semiconductor memory devices, the cold page storing cold data having a data access frequency smaller than a reference frequency during a reference time interval, and the hot page storing hot data having the data access frequency equal to or greater than the reference frequency during the reference time interval, and
      perform a data migration to migrate one or more cold pages of a first rank of a first channel from among the plurality of channels to a second rank of the first channel based on a result of the monitoring;
   a power management engine configured to control the power mode of the memory resource based on whether the data migration is performed; and
   a remapping engine configured to map first physical addresses of the one or more cold pages of the first rank of the first channel to second physical addresses of pages of the second rank of the first channel, in response to the data migration being performed.

4. The memory system of claim 3, wherein when the data migration is performed and when one or more cold pages of the second rank of the first channel are migrated to a third rank, the power management engine is further configured to enter the second rank of the first channel into a deep power-down mode.

5. The memory system of claim 3, wherein when the data migration is performed and when one or more cold pages of the second rank of the first channel are not migrated to a third rank, the power management engine is further configured to enter the second rank of the first channel to a self-refresh mode.

6. The memory system of claim 3, wherein when the data migration is not performed based on an available data storage capacity of the second rank of the first channel being smaller than a size of cold pages of the first rank of the first channel, the power management engine is further configured to enter the second rank of the first channel into a self-refresh mode.

7. The memory system of claim 3, wherein the hot/cold page profiler comprises:
   a first counter configured to generate a first counting signal by counting a number of memory requests from the at least one host during the reference time interval;
   a first comparator configured to generate a first comparison signal by comparing the first counting signal with the first reference value;
   a plurality of second counters configured to generate second counting signals, respectively, by counting respective memory requests to pages of the plurality of memory regions during the reference time interval;
   a plurality of second comparators configured to generate a plurality of second comparison signals by comparing the second counting signals with a second reference value, respectively;
   a signal generator configured to:
      generate a first enable signal that activates the plurality of second counters based on the first comparison signal, and
      generate a migration control signal based on the plurality of second comparison signals; and a migration manager configured to:
  calculate an available data storage capacity of a cold rank of the first rank and the second rank for at least one of the plurality of channels, and
  perform the data migration selectively based on the migration control signal and the available data storage capacity of the cold rank.

8. The memory system of claim 7, wherein the migration manager is further configured to refrain from performing the data migration based on an available data storage capacity of the first rank being smaller than one or more cold pages of the second rank of the first channel.

9. The memory system of claim 7, wherein the migration manager is further configured to refrain from performing the data migration based on an available data storage capacity of the first rank being equal to or greater than one or more cold pages of the second rank of the first channel.

10. The memory system of claim 7, wherein the hot/cold page profiler further comprises a timer configured to:
  apply a second enable signal that activates the first counter to the first counter periodically, and
  reset the first counter and the plurality of second counters by applying a reset signal to the first counter and the plurality of second counters after the reference time interval elapses.

11. The memory system of claim 3, wherein the remapping engine is further configured to allocate the at least one virtual machine running on each of the plurality of hosts to a same rank of each of the plurality of channels,
  wherein the power management engine is further configured to enter the idle memory region into a deep power-down mode or exit the idle memory region from the deep power-down mode based on allocation and deallocation of the at least one virtual machine, and
  wherein the hot/cold page profiler is further configured to monitor the hot page and the cold page periodically.

12. The memory system of claim 11, wherein the different ranks comprise a first rank and a second rank, and
  wherein the power management engine is further configured to enter the second rank of the each of the plurality of channels into the deep power-down mode based on the remapping engine allocating the at least one virtual machine run on each of the plurality of hosts to the first rank of each of the plurality of channels.

13. The memory system of claim 3, wherein, based on a cache miss occurring in a first host from among the plurality of hosts, the remapping engine is configured to:
  receive a host physical address comprising a host identifier to identify the first host and a device logical address to access one of the plurality of semiconductor memory devices; and
  access a memory block of one of the plurality of semiconductor memory devices based on the host identifier and the device logical address.

14. The memory system of claim 13, wherein the remapping engine comprises:
  a remapping cache configured to store a portion of mapping relations from among total mapping relations between host physical addresses of the plurality of hosts and memory blocks of the plurality of semiconductor memory devices;
  a host address table configured to store host block tables of the plurality of hosts;
  a block address table set configured to store block base addresses, each corresponding to a start address of each of the memory blocks of the plurality of semiconductor memory devices, the block base addresses being referred to by the host block tables, respectively;
  a remapping table configured to store device physical addresses designated by the block base addresses; and
  a control manager configured to search a physical address of a target memory block designated by the device logical address by referring to the remapping cache, the host address table, the block address table set and the remapping table.

15. The memory system of claim 14, wherein the control manager is further configured to search the physical address of the target memory block by referring to the remapping cache and configured to access the memory resource based on the searched physical address in response to a cache hit occurring the remapping cache.

16. The memory system of claim 14, wherein the control manager is further configured to:
  search the physical address of the target memory block corresponding to the host identifier of the first host by referring to the remapping cache, and
  based on a cache miss occurring in the remapping cache:
    search a host block table of the first host in the host address table based on the host identifier of the first host;
    search a block base address of the target memory block in the block address table set based on the host block table of the first host; and
    obtain the physical address of the target memory block in the remapping table based on the block base address of the target memory block.

17. The memory system of claim 1, wherein the memory system comprises a Type 3 pooled memory system defined by a CXL protocol.

18. A computing system comprising:
  a plurality of hosts, each of the plurality of hosts configured to drive at least one virtual machine; and
  a memory system configured to process a memory request from the plurality of hosts based on communication with the plurality of hosts through a compute express link (CXL) interface,
  wherein the memory system comprises:
  a memory resource comprising a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and
  a controller connected to the plurality of semiconductor memory devices through the plurality of channels, the controller configured to control the plurality of semiconductor memory devices based on the communication with the plurality of hosts through the CXL interface,
  wherein the controller is configured to control a power mode of the memory resource by managing an idle memory region from among a plurality of memory regions of the plurality of semiconductor memory devices at a rank level without intervention of the plurality of hosts, the plurality of memory regions configured to store data, and
  wherein the idle memory region corresponds to a memory region that does not store the data, from among the plurality of memory regions, or a memory region that has an access frequency smaller than a reference frequency during a reference time interval.

19. The computing system of claim 18, wherein each of the plurality of hosts comprises at least one of a graphic processing unit (GPU), a neural processing unit (NPU), a field programmable gate array (FPGA), a network interface card or a peripheral device which communicate based on CXL protocol.

20. A memory system comprising:
- a memory resource comprising a plurality of semiconductor memory devices coupled to each other through an internal bus, the plurality of semiconductor memory devices being divided into a first semiconductor memory and a second semiconductor memory for each of a plurality of channels, the first semiconductor memory and the second semiconductor memory belonging to different ranks; and
- a controller connected to the plurality of semiconductor memory devices through the plurality of channels, the controller configured to control the plurality of semiconductor memory devices based on communication with a plurality of hosts through a compute express link (CXL) interface, each of the plurality of hosts configured to drive at least one virtual machine,
- wherein the controller is configured to control a power mode of the memory resource by managing an idle memory region from among a plurality of memory regions of the plurality of semiconductor memory devices at a rank level without intervention of the plurality of hosts, the plurality of memory regions configured to store data,
- wherein the controller comprises a hot/cold page profiler, and
- wherein the hot/cold page profiler, based on a total memory traffic requested from at least one host from among the plurality of hosts being smaller than a first reference value, is configured to:
  - monitor a cold page and a hot page from among a plurality of pages of the plurality of the semiconductor memory devices, the cold page storing cold data having a data access frequency smaller than a reference frequency during a reference time interval, and the hot page storing hot data having the data access frequency equal to or greater than the reference frequency during the reference time interval, and
  - perform a data migration to migrate one or more cold pages of a first rank of a first channel from among the plurality of channels to a second rank of the first channel based on a result of the monitoring.

\* \* \* \* \*